(12) United States Patent
Haughawout et al.

(10) Patent No.: US 12,154,428 B2
(45) Date of Patent: Nov. 26, 2024

(54) SYSTEM AND METHOD FOR WIDGET-ASSISTED SETUP OF A UNIVERSAL REMOTE CONTROL

(71) Applicant: Universal Electronics Inc., Scottsdale, AZ (US)

(72) Inventors: Joseph Lee Haughawout, Aliso Viejo, CA (US); Arsham Hatambeiki, Irvine, CA (US); Paul Ogaz, Cypress, CA (US); Jeffrey Kohanek, Westminster, CA (US); Patrick H. Hayes, Mission Viejo, CA (US)

(73) Assignee: UNIVERSAL ELECTRONICS INC., Scottsdale, AZ (US)

( * ) Notice: Subject to any disclaimer, the term of this patent is extended or adjusted under 35 U.S.C. 154(b) by 0 days.

(21) Appl. No.: 18/229,841

(22) Filed: Aug. 3, 2023

(65) Prior Publication Data
US 2023/0410642 A1    Dec. 21, 2023

Related U.S. Application Data

(63) Continuation of application No. 17/748,254, filed on May 19, 2022, now Pat. No. 11,769,398, which is a
(Continued)

(51) Int. Cl.
*G08C 19/28* (2006.01)
*H04N 5/445* (2011.01)
(Continued)

(52) U.S. Cl.
CPC ............. *G08C 19/28* (2013.01); *H04N 5/445* (2013.01); *H04N 21/42204* (2013.01);
(Continued)

(58) Field of Classification Search
CPC ............... G08C 19/28; G08C 2201/20; G08C 2201/30; G08C 2201/92; G08C 17/00;
(Continued)

(56) References Cited

U.S. PATENT DOCUMENTS 4,626,848 A   12/1986 Ehlers
4,703,359 A   10/1987 Rumbolt
(Continued)

FOREIGN PATENT DOCUMENTS

CN   103179208 A   6/2013
CN   103685746 A   3/2014
(Continued)

OTHER PUBLICATIONS

Examination report issued on European patent application No. 11870232.3, dated Dec. 14, 2016, 3 pages.
(Continued)

*Primary Examiner* — James J Yang
(74) *Attorney, Agent, or Firm* — Greenberg Traurig, LLP

(57) ABSTRACT

A system and method for enabling set up of a controlling device capable of controlling a plurality of appliances provides an interactive instruction set and associated programming which is downloadable to a controllable appliance having an associated display, such as an Internet enabled television. The programming is accessible by the controllable appliance and is configured to appropriately display interactive instructions from the interactive instruction set to a user during a user initiated set up procedure for setting up the controlling device to communicate commands to another controllable device (e.g., a DVD, VCR, DVR, etc).

24 Claims, 14 Drawing Sheets

Related U.S. Application Data continuation of application No. 15/986,489, filed on May 22, 2018, now Pat. No. 11,682,294, which is a continuation of application No. 15/785,509, filed on Oct. 17, 2017, now Pat. No. 10,026,307, which is a continuation of application No. 12/974,231, filed on Dec. 21, 2010, now Pat. No. 9,805,591, said application No. 15/785,509 is a continuation of application No. 11/515,962, filed on Sep. 5, 2006, now Pat. No. 7,907,222.

(60) Provisional application No. 61/289,486, filed on Dec. 23, 2009, provisional application No. 60/715,229, filed on Sep. 8, 2005.

(51) Int. Cl.
*H04N 21/422* (2011.01)
*H04N 21/485* (2011.01)
*H04N 21/61* (2011.01)
*H04N 21/41* (2011.01)

(52) U.S. Cl.
CPC ..... *H04N 21/42225* (2013.01); *H04N 21/485* (2013.01); *H04N 21/6125* (2013.01); *G08C 2201/20* (2013.01); *G08C 2201/30* (2013.01); *G08C 2201/92* (2013.01); *H04N 21/4135* (2013.01); *H04N 21/42226* (2013.01)

(58) Field of Classification Search
CPC ............ H04N 5/445; H04N 21/42204; H04N 21/42225; H04N 21/485; H04N 21/6125; H04N 21/4135; H04N 21/42226
See application file for complete search history.

(56) References Cited

U.S. PATENT DOCUMENTS

| | | |
|---|---|---|
| 4,746,919 A | 5/1988 | Reitmeier |
| 4,959,810 A | 9/1990 | Darbee |
| 4,998,292 A | 3/1991 | Eigeldinger |
| 5,255,313 A | 10/1993 | Darbee |
| 5,341,166 A | 8/1994 | Garr |
| 5,410,326 A | 4/1995 | Goldstein |
| 5,452,291 A | 9/1995 | Eisenhandler |
| 5,481,256 A | 1/1996 | Darbee |
| 5,519,457 A | 5/1996 | Nishigaki |
| 5,537,104 A | 7/1996 | Van Dort |
| 5,552,917 A | 9/1996 | Darbee |
| 5,614,906 A | 3/1997 | Hayes |
| 5,689,663 A | 11/1997 | Williams |
| 5,726,645 A | 3/1998 | Kamon |
| 5,835,156 A | 11/1998 | Blonstein |
| 5,839,097 A | 11/1998 | Klausner |
| 5,889,506 A | 3/1999 | Lopresti |
| 5,909,183 A | 6/1999 | Borgstahl |
| 5,949,351 A | 9/1999 | Hahm |
| 5,959,539 A | 9/1999 | Adolph |
| 5,959,751 A | 9/1999 | Darbee |
| 5,990,884 A | 11/1999 | Douma |
| 6,005,490 A | 12/1999 | Higashihara |
| 6,008,735 A | 12/1999 | Chiloyan |
| 6,014,092 A | 1/2000 | Darbee |
| 6,097,441 A * | 8/2000 | Allport ............ H04N 21/41265 348/E5.103 |
| 6,127,961 A | 10/2000 | Stacy |
| 6,133,847 A | 10/2000 | Yang |
| 6,148,241 A | 11/2000 | Ludtke |
| 6,157,319 A | 12/2000 | Johns |
| 6,160,491 A | 12/2000 | Kitao |
| 6,177,931 B1 | 1/2001 | Alexander |
| 6,208,341 B1 | 3/2001 | van Ee |
| 6,208,384 B1 | 3/2001 | Schultheiss |
| 6,211,870 B1 | 4/2001 | Foster |
| 6,259,892 B1 | 7/2001 | Helferich |
| 6,344,817 B1 | 2/2002 | Verzulli |
| 6,473,099 B1 | 10/2002 | Goldman |
| 6,529,556 B1 | 3/2003 | Perdue |
| 6,567,011 B1 | 5/2003 | Young |
| 6,597,374 B1 | 7/2003 | Baker |
| 6,633,281 B2 | 10/2003 | Lin |
| 6,650,248 B1 * | 11/2003 | O'Donnell ....... H04N 21/42225 348/E5.103 |
| 6,665,020 B1 | 12/2003 | Stahl |
| 6,690,392 B1 | 2/2004 | Wugoski |
| 6,724,339 B2 | 4/2004 | Conway |
| 6,748,278 B1 | 6/2004 | Maymudes |
| 6,781,518 B1 | 8/2004 | Hayes |
| 6,791,467 B1 | 9/2004 | Ben-Ze'ev |
| 6,795,130 B2 | 9/2004 | Shibamiya |
| 6,826,699 B1 | 11/2004 | Sun |
| 6,850,252 B1 | 2/2005 | Hoffberg |
| 6,909,378 B1 * | 6/2005 | Lambrechts ........... G08C 19/28 340/4.32 |
| 6,940,562 B2 | 9/2005 | Sato |
| 6,947,101 B2 | 9/2005 | Arling |
| 6,968,399 B2 | 11/2005 | Noda |
| 6,971,072 B1 | 11/2005 | Stein |
| 6,980,150 B2 | 12/2005 | Conway, Jr. |
| 7,013,434 B2 | 3/2006 | Masters |
| 7,046,161 B2 | 5/2006 | Hayes |
| 7,136,709 B2 | 11/2006 | Arling et al. |
| 7,154,566 B2 | 12/2006 | Gustafson |
| 7,254,777 B2 | 8/2007 | Hayes |
| 7,259,696 B1 | 8/2007 | Lee |
| 7,271,732 B2 | 9/2007 | Harada |
| 7,375,673 B2 | 5/2008 | Spilo |
| 7,379,778 B2 | 5/2008 | Hayes |
| 7,429,932 B1 | 9/2008 | Newell |
| 7,436,346 B2 | 10/2008 | Walter |
| 7,519,393 B2 | 4/2009 | Bahl |
| 7,554,614 B2 | 6/2009 | Satou |
| 7,562,128 B1 | 7/2009 | Caris |
| 7,589,642 B1 | 9/2009 | Mui |
| 7,671,758 B1 | 3/2010 | Seidel |
| 7,768,421 B2 | 8/2010 | Suzuki |
| 7,827,319 B2 | 11/2010 | Kimura |
| 7,831,930 B2 | 11/2010 | Dresti |
| 7,907,222 B2 | 3/2011 | Haughawout |
| 7,936,287 B1 | 5/2011 | Lee |
| 7,944,370 B1 | 5/2011 | Harris |
| 7,969,514 B2 | 6/2011 | Haughawout et al. |
| 8,040,888 B1 | 10/2011 | Macadam |
| 8,068,184 B2 | 11/2011 | Hicks |
| 8,098,337 B2 | 1/2012 | Martch |
| 8,132,105 B1 | 3/2012 | Dubil |
| 8,179,404 B2 | 5/2012 | Nagatomo |
| 8,189,120 B2 | 5/2012 | Doyle |
| 8,199,258 B2 | 6/2012 | Tokoro |
| 8,203,436 B2 | 6/2012 | Ikeda |
| 8,260,975 B1 | 9/2012 | Schanin |
| 8,269,892 B2 | 9/2012 | Asada |
| 8,342,915 B1 | 1/2013 | Vogel |
| 8,373,556 B2 | 2/2013 | Lalonde |
| 8,429,713 B2 | 4/2013 | Candelore |
| 8,477,179 B2 | 7/2013 | Tatsuta |
| 8,508,401 B1 | 8/2013 | Patel |
| 8,509,400 B2 | 8/2013 | Liu |
| 8,525,938 B2 | 9/2013 | Haughawout |
| 8,633,986 B1 | 1/2014 | Hughes |
| 8,704,698 B2 | 4/2014 | Park |
| 8,810,732 B1 | 8/2014 | Bozarth |
| 8,839,334 B2 | 9/2014 | Lee |
| 8,854,192 B1 | 10/2014 | Harris |
| 8,854,556 B2 | 10/2014 | Haughawout |
| 8,881,205 B2 | 11/2014 | Friedman |
| 8,995,981 B1 | 3/2015 | Aginsky |
| 9,019,435 B2 | 4/2015 | Barnett et al. |
| 9,047,761 B2 | 6/2015 | Haughawout |
| 9,088,663 B2 | 7/2015 | Arling |
| 9,098,868 B1 | 8/2015 | Issa |
| 9,123,236 B2 | 9/2015 | Haughawout |
| 9,239,837 B2 | 1/2016 | Chardon |

(56) References Cited

U.S. PATENT DOCUMENTS

| | | |
|---|---|---|
| 9,350,850 B2 | 5/2016 | Pope |
| 9,451,306 B2 | 9/2016 | Sarukkai |
| 9,489,835 B2 | 11/2016 | Haughawout |
| 9,554,061 B1 | 1/2017 | Proctor, Jr. |
| 9,599,981 B2 | 3/2017 | Crabtree |
| 9,648,358 B2 | 5/2017 | Ellis |
| 9,792,133 B2 | 11/2017 | Lee et al. |
| 9,852,615 B2 | 12/2017 | Perez |
| 9,978,263 B2 | 5/2018 | Haughawout |
| 10,074,364 B1 | 9/2018 | Wightman |
| 10,217,352 B2 | 2/2019 | Arling |
| 10,397,749 B1 | 8/2019 | Barua |
| 10,553,106 B2 | 2/2020 | Jeon |
| 10,593,196 B2 | 3/2020 | Arling |
| 10,600,317 B2 | 3/2020 | Haughawout |
| 10,902,716 B2 | 1/2021 | Perez |
| 11,398,148 B2 | 7/2022 | Perez |
| 11,716,458 B2 | 8/2023 | Marino |
| 2001/0005197 A1 | 6/2001 | Mishra |
| 2001/0043145 A1 | 11/2001 | Jacobson, Jr. |
| 2002/0124249 A1 | 9/2002 | Shintani |
| 2002/0140569 A1 | 10/2002 | van Ee |
| 2002/0158771 A1 | 10/2002 | Mears |
| 2002/0174270 A1 | 11/2002 | Stecyk |
| 2002/0194299 A1 | 12/2002 | Yasaki |
| 2002/0194596 A1 | 12/2002 | Srivastava |
| 2003/0028761 A1 | 2/2003 | Platt |
| 2003/0095156 A1 | 5/2003 | Klein |
| 2003/0095211 A1 | 5/2003 | Nakajima |
| 2003/0103088 A1 | 6/2003 | Dresti |
| 2003/0115599 A1 | 6/2003 | Bennington |
| 2003/0122698 A1 | 7/2003 | Horie |
| 2003/0141987 A1 | 7/2003 | Hayes |
| 2003/0163542 A1 | 8/2003 | Bulthuis |
| 2003/0189509 A1 | 10/2003 | Hayes |
| 2004/0010327 A1 | 1/2004 | Terashima |
| 2004/0056789 A1 | 3/2004 | Arling |
| 2004/0070491 A1 | 4/2004 | Huang |
| 2004/0075602 A1 | 4/2004 | Griesau |
| 2004/0078822 A1 | 4/2004 | Breen |
| 2004/0113892 A1 | 6/2004 | Mears |
| 2004/0143847 A1 | 7/2004 | Suzuki |
| 2004/0148632 A1 | 7/2004 | Park |
| 2004/0163073 A1 | 8/2004 | Krzyzanowski |
| 2004/0203387 A1 | 10/2004 | Grannan |
| 2004/0207535 A1 | 10/2004 | Stevenson |
| 2004/0210933 A1 | 10/2004 | Dresti |
| 2004/0228605 A1 | 11/2004 | Quan |
| 2004/0235463 A1 | 11/2004 | Patel |
| 2004/0255329 A1 | 12/2004 | Compton |
| 2004/0257239 A1 | 12/2004 | Griesau |
| 2004/0266419 A1 | 12/2004 | Arling |
| 2005/0028208 A1 | 2/2005 | Ellis |
| 2005/0052423 A1 | 3/2005 | Harris et al. |
| 2005/0068222 A1 | 3/2005 | Krzyzanowski |
| 2005/0076153 A1 | 4/2005 | Nedellec |
| 2005/0097618 A1 | 5/2005 | Arling |
| 2005/0110651 A1 | 5/2005 | Martis |
| 2005/0151726 A1 | 7/2005 | Wouters |
| 2005/0154787 A1 | 7/2005 | Cochran |
| 2005/0159823 A1 | 7/2005 | Hayes |
| 2005/0160468 A1 | 7/2005 | Rodriguez |
| 2005/0195823 A1 | 9/2005 | Chen |
| 2005/0210498 A1 | 9/2005 | Scott, III |
| 2005/0220194 A1 | 10/2005 | Compton |
| 2005/0221792 A1 | 10/2005 | Mattisson |
| 2005/0243057 A1 | 11/2005 | Sugiyama |
| 2005/0273817 A1 | 12/2005 | Rodriguez |
| 2006/0007015 A1 | 1/2006 | Krzyzanowski |
| 2006/0044175 A1 | 3/2006 | Choi |
| 2006/0080408 A1 | 4/2006 | Istvan |
| 2006/0080707 A1 | 4/2006 | Laksono |
| 2006/0095401 A1 | 5/2006 | Krikorian |
| 2006/0095596 A1 | 5/2006 | Yung |
| 2006/0146184 A1 | 7/2006 | Gillard |
| 2006/0150123 A1 | 7/2006 | Goodwin et al. |
| 2006/0156109 A1 | 7/2006 | Kojima |
| 2006/0168618 A1 | 7/2006 | Choi |
| 2006/0197753 A1 | 9/2006 | Hotelling |
| 2006/0200538 A1 | 9/2006 | Yuh |
| 2006/0227032 A1 | 10/2006 | Vidal |
| 2006/0245725 A1 | 11/2006 | Lim |
| 2006/0263091 A1 | 11/2006 | Shimizu |
| 2006/0271997 A1 | 11/2006 | Jacoby |
| 2007/0052547 A1 | 3/2007 | Haughawout |
| 2007/0063860 A1 | 3/2007 | Escobosa |
| 2007/0063862 A1 | 3/2007 | Lippincott |
| 2007/0130607 A1 | 6/2007 | Thissen |
| 2007/0165555 A1 | 7/2007 | Deng |
| 2007/0220150 A1 | 9/2007 | Garg |
| 2007/0225828 A1 | 9/2007 | Huang |
| 2007/0229465 A1 | 10/2007 | Sakai |
| 2007/0268360 A1 | 11/2007 | Ahlgren |
| 2007/0288610 A1 | 12/2007 | Saint Clair |
| 2007/0288932 A1 | 12/2007 | Horvitz |
| 2007/0292135 A1 | 12/2007 | Guo |
| 2008/0004954 A1 | 1/2008 | Horvitz |
| 2008/0005764 A1 | 1/2008 | Arling |
| 2008/0007616 A1 | 1/2008 | Baladhandayuthapani |
| 2008/0044006 A1 | 2/2008 | Kitagawa |
| 2008/0046919 A1 | 2/2008 | Carmi |
| 2008/0098426 A1 | 4/2008 | Candelore |
| 2008/0120673 A1 | 5/2008 | Dong |
| 2008/0126591 A1 | 5/2008 | Kwon |
| 2008/0134237 A1 | 6/2008 | Tu et al. |
| 2008/0139181 A1 | 6/2008 | Lokshin |
| 2008/0141316 A1 | 6/2008 | Igoe |
| 2008/0155071 A1 | 6/2008 | Lindstrom |
| 2008/0168519 A1 | 7/2008 | Rao |
| 2008/0187028 A1 | 8/2008 | Lida |
| 2008/0195857 A1 | 8/2008 | Douillet |
| 2008/0221715 A1 | 9/2008 | Krzyzanowski |
| 2008/0231762 A1 | 9/2008 | Hardacker |
| 2008/0244097 A1 | 10/2008 | Candelore et al. |
| 2008/0247544 A1 | 10/2008 | Candelore |
| 2008/0278567 A1 | 11/2008 | Nakajima |
| 2008/0319852 A1 | 12/2008 | Gardner |
| 2008/0320531 A1 | 12/2008 | Kim |
| 2008/0320542 A1 | 12/2008 | Guzman |
| 2009/0015723 A1 | 1/2009 | Doumuki |
| 2009/0031419 A1 | 1/2009 | Laksono |
| 2009/0040091 A1 | 2/2009 | Carlson |
| 2009/0051824 A1 | 2/2009 | Satou |
| 2009/0079813 A1 | 3/2009 | Hildreth |
| 2009/0092397 A1 | 4/2009 | Taguchi |
| 2009/0094645 A1 | 4/2009 | Ting |
| 2009/0106785 A1 | 4/2009 | Pharn |
| 2009/0113478 A1 | 4/2009 | Haughawout |
| 2009/0115723 A1 | 5/2009 | Henty |
| 2009/0121905 A1 | 5/2009 | Griffin, Jr. |
| 2009/0156051 A1 | 6/2009 | Doyle |
| 2009/0156251 A1 | 6/2009 | Cannistraro |
| 2009/0157198 A1 | 6/2009 | Morikawa |
| 2009/0167555 A1 | 7/2009 | Kohanek |
| 2009/0172746 A1 | 7/2009 | Aldrey |
| 2009/0195407 A1 | 8/2009 | Nakano et al. |
| 2009/0207039 A1 | 8/2009 | Haijima |
| 2009/0239587 A1 | 9/2009 | Negron |
| 2009/0248909 A1 | 10/2009 | Hironaka |
| 2009/0254500 A1 | 10/2009 | Stecyk |
| 2009/0254778 A1 | 10/2009 | Huang |
| 2009/0265163 A1 | 10/2009 | Lehmann et al. |
| 2009/0284656 A1 | 11/2009 | Suzuki |
| 2009/0289829 A1 | 11/2009 | Maier |
| 2009/0296731 A1 | 12/2009 | Lida |
| 2009/0298535 A1 | 12/2009 | Klein |
| 2010/0013998 A1 | 1/2010 | Mortensen |
| 2010/0014834 A1 | 1/2010 | Flynn |
| 2010/0034522 A1 | 2/2010 | Ng |
| 2010/0037264 A1 | 2/2010 | Hardacker |
| 2010/0039282 A1 | 2/2010 | Hostage |
| 2010/0043046 A1 | 2/2010 | Sen |
| 2010/0052843 A1 | 3/2010 | Cannistraro |
| 2010/0079682 A1 | 4/2010 | Martch |

(56) References Cited

U.S. PATENT DOCUMENTS

| | | |
|---|---|---|
| 2010/0118193 A1 | 5/2010 | Boyden et al. |
| 2010/0131682 A1 | 5/2010 | Huang |
| 2010/0134317 A1 | 6/2010 | Breuil |
| 2010/0135279 A1 | 6/2010 | Petersson |
| 2010/0138764 A1 | 6/2010 | Hatambeiki |
| 2010/0149017 A1 | 6/2010 | Besshi |
| 2010/0153990 A1 | 6/2010 | Ress |
| 2010/0157169 A1 | 6/2010 | Yoshida |
| 2010/0177245 A1 | 7/2010 | Ohnuma |
| 2010/0182236 A1 | 7/2010 | Pryor |
| 2010/0194983 A1 | 8/2010 | Iguchi |
| 2010/0228611 A1 | 9/2010 | Shenfield |
| 2010/0271560 A1 | 10/2010 | Higuchi |
| 2010/0296558 A1 | 11/2010 | Matsushita |
| 2010/0315279 A1 | 12/2010 | Hamai |
| 2010/0328547 A1 | 12/2010 | Mayorga |
| 2011/0074591 A1 | 3/2011 | Arling |
| 2011/0102230 A1 | 5/2011 | Vergis |
| 2011/0122317 A1 | 5/2011 | Chen |
| 2011/0125301 A1 | 5/2011 | Inoue |
| 2011/0138327 A1 | 6/2011 | Scott |
| 2011/0142059 A1 | 6/2011 | Bedingfield, Sr. |
| 2011/0156944 A1 | 6/2011 | Ward |
| 2011/0179149 A1 | 7/2011 | Kazan |
| 2011/0181386 A1 | 7/2011 | Lee |
| 2011/0187928 A1 | 8/2011 | Crabtree |
| 2011/0273287 A1 | 11/2011 | Lalonde |
| 2011/0273625 A1 | 11/2011 | McMahon et al. |
| 2011/0274008 A1 | 11/2011 | Lida |
| 2011/0283129 A1 | 11/2011 | Guillerm |
| 2011/0285818 A1 | 11/2011 | Park |
| 2011/0289113 A1 | 11/2011 | Arling |
| 2011/0291971 A1 | 12/2011 | Masaki et al. |
| 2011/0302619 A1 | 12/2011 | Hale |
| 2011/0314153 A1 | 12/2011 | Bathiche |
| 2012/0013449 A1 | 1/2012 | Penisoara |
| 2012/0013807 A1 | 1/2012 | Arora |
| 2012/0019400 A1 | 1/2012 | Patel |
| 2012/0019633 A1 | 1/2012 | Holley |
| 2012/0021684 A1 | 1/2012 | Schultz et al. |
| 2012/0025957 A1 | 2/2012 | Yang |
| 2012/0050310 A1 | 3/2012 | Patel |
| 2012/0062805 A1 | 3/2012 | Candelore |
| 2012/0069246 A1 | 3/2012 | Thornberry |
| 2012/0069894 A1 | 3/2012 | Sakimura |
| 2012/0082461 A1 | 4/2012 | Meyer |
| 2012/0084452 A1 | 4/2012 | Pettit |
| 2012/0084662 A1 | 4/2012 | Navarro |
| 2012/0086869 A1 | 4/2012 | Friedlander |
| 2012/0105721 A1 | 5/2012 | Huang |
| 2012/0131245 A1 | 5/2012 | Wilcox |
| 2012/0133841 A1 | 5/2012 | Vanderhoff |
| 2012/0144416 A1 | 6/2012 | Wetzer |
| 2012/0146918 A1 | 6/2012 | Kreiner |
| 2012/0171958 A1 | 7/2012 | Cornett |
| 2012/0173003 A1 | 7/2012 | Kim |
| 2012/0185580 A1 | 7/2012 | Detert |
| 2012/0196536 A1 | 8/2012 | Koo |
| 2012/0236161 A1 | 9/2012 | Kwon |
| 2012/0242526 A1 | 9/2012 | Perez |
| 2012/0249890 A1 | 10/2012 | Chardon |
| 2012/0274547 A1 | 11/2012 | Raeber |
| 2012/0274857 A1 | 11/2012 | Maxwell |
| 2012/0274863 A1 | 11/2012 | Chardon et al. |
| 2012/0278693 A1 | 11/2012 | Black |
| 2012/0284758 A1 | 11/2012 | Adjesson |
| 2012/0291128 A1 | 11/2012 | Jayawardena |
| 2012/0297040 A1 | 11/2012 | Amano |
| 2012/0330943 A1 | 12/2012 | Weber |
| 2013/0005250 A1 | 1/2013 | Kim |
| 2013/0057774 A1 | 3/2013 | Yoshida |
| 2013/0058522 A1 | 3/2013 | Raesig |
| 2013/0069769 A1 | 3/2013 | Pennington et al. |
| 2013/0085851 A1 | 4/2013 | Pedro |
| 2013/0106977 A1 | 5/2013 | Chu |
| 2013/0107131 A1 | 5/2013 | Barnett |
| 2013/0198005 A1 | 8/2013 | Xiong |
| 2013/0249679 A1 | 9/2013 | Arling |
| 2013/0258918 A1 | 10/2013 | Rudland |
| 2013/0265248 A1 | 10/2013 | Nagahara |
| 2013/0276010 A1 | 10/2013 | Drayson |
| 2013/0298147 A1 | 11/2013 | Klein |
| 2013/0304817 A1 | 11/2013 | Hu |
| 2014/0085059 A1 | 3/2014 | Chen |
| 2014/0115631 A1 | 4/2014 | Mak |
| 2014/0157305 A1 | 6/2014 | Del Sordo |
| 2014/0222861 A1 | 8/2014 | Arling |
| 2014/0235526 A1 | 8/2014 | Srivastava |
| 2014/0279047 A1 | 9/2014 | Wang |
| 2014/0337879 A1 | 11/2014 | Arling |
| 2015/0032541 A1 | 1/2015 | Haddad |
| 2015/0187206 A1 | 7/2015 | Saurin |
| 2015/0289030 A1 | 10/2015 | Roberts |
| 2016/0017585 A1 | 1/2016 | Plate |
| 2016/0057537 A1 | 2/2016 | Robinson |
| 2016/0125733 A1 | 5/2016 | Sallas |
| 2016/0173961 A1 | 6/2016 | Coan |
| 2017/0024119 A1 | 1/2017 | Wild |
| 2017/0168595 A1 | 6/2017 | Sakaguchi |
| 2017/0205783 A1 | 7/2017 | Tannenbaum |
| 2017/0279497 A1 | 9/2017 | Schultz et al. |
| 2017/0289484 A1 | 10/2017 | Arling |
| 2018/0130469 A1 | 5/2018 | Gruenstein |
| 2018/0211651 A1 | 7/2018 | Hall |
| 2019/0033446 A1 | 1/2019 | Bultan |
| 2019/0261043 A1 | 8/2019 | Hideki |
| 2019/0287525 A1 | 9/2019 | Kim |
| 2019/0379887 A1 | 12/2019 | Marino |
| 2020/0092641 A1 | 3/2020 | Smus |
| 2020/0204613 A1 | 6/2020 | Hatambeiki |
| 2021/0120301 A1 | 4/2021 | Xu |
| 2021/0368562 A1 | 11/2021 | Hatambeiki |
| 2022/0030296 A1 | 1/2022 | Satheesh |
| 2022/0051554 A1 | 2/2022 | Tchedikian |
| 2022/0053230 A1 | 2/2022 | Tchedikian |
| 2022/0109669 A1 | 4/2022 | Yuh |
| 2022/0294639 A1 | 9/2022 | Amsalem |
| 2023/0106761 A1 | 4/2023 | Coffman |

FOREIGN PATENT DOCUMENTS

| | | |
|---|---|---|
| CN | 101910960 A | 6/2014 |
| CN | 102541547 B | 12/2015 |
| CN | 103999137 A | 4/2017 |
| DE | 197098002 A1 | 9/1998 |
| EP | 0513443 B1 | 11/1999 |
| EP | 1722341 A1 | 11/2006 |
| EP | 2265003 A2 | 12/2010 |
| EP | 3084744 A1 | 10/2016 |
| EP | 1489575 B1 | 7/2017 |
| EP | 2490195 B1 | 4/2022 |
| GB | 2166328 A | 6/1989 |
| JP | 05083765 A | 7/2009 |
| JP | 2010034853 A | 2/2010 |
| JP | 2013085225 A | 5/2013 |
| KR | 10-2011-0051788 | 5/2011 |
| KR | 10-2013-0070764 | 6/2013 |
| WO | 8911137 W | 11/1989 |
| WO | 9732290 | 9/1997 |
| WO | 0013344 A1 | 3/2000 |
| WO | 0017738 | 3/2000 |
| WO | 0034851 | 6/2000 |
| WO | 0039772 | 7/2000 |
| WO | 0147130 | 6/2001 |
| WO | 03044684 | 5/2003 |
| WO | 03044756 W | 5/2003 |
| WO | 0383801 | 10/2003 |
| WO | 0451592 | 6/2004 |
| WO | 05036325 | 4/2005 |
| WO | 2007105142 A1 | 9/2007 |
| WO | 2011053008 A2 | 5/2011 |
| WO | 2015095637 A1 | 6/2015 |
| WO | 2016126609 A2 | 8/2016 |
| WO | 2018198036 A1 | 11/2018 |

(56) References Cited

FOREIGN PATENT DOCUMENTS

| WO | 2018224812 A1 | 12/2018 |
|---|---|---|
| WO | 2019236764 A1 | 12/2019 |
| WO | 2020172134 A1 | 8/2020 |
| WO | 2020232336 A1 | 11/2020 |

OTHER PUBLICATIONS

Examination report issued on European patent application No. 11872554.8, dated Jul. 31, 2018, 5 pages.
Examination report issued on European patent application No. 15796548.4, dated Aug. 16, 2019, 5 pages.
Examination report issued on European patent application No. 16747061.6, dated Apr. 14, 2020, 5 pages.
Examination report issued on European patent application No. 21170794.8, dated Aug. 31, 2022, 3 pages.
Extended European Search Report issued on European Patent Application No. 11870232.3, dated Nov. 19, 2014, 7 pages.
Extended European Search Report issued on European Patent Application No. 11872554.8, dated Feb. 26, 2015, 5 pages.
Extended European Search Report issued on European Patent Application No. 12763258.6, dated Jan. 2, 2014, 7 pages.
Extended European Search Report issued on European Patent Application No. 12763258.6, dated Jul. 28, 2014, 8 pages.
Extended European search report issued on European patent application No. 21170794.8, dated Sep. 20, 2021, 7 pages.
Final Office Action issued in U.S. Appl. No. 17/733,254, dated Jan. 10, 2023, 11 pgs.
Final Office Action issued on U.S. Appl. No. 14/736,909, dated Aug. 16, 2018, 6 pgs.
Ingrid Wickelgren, Apr. 1997, IEEE Spectrum, vol. Apr. 1997, pp. 20-25.
International Preliminary Report on Patentability issued on PCT application No. US/2015/030258, dated Dec. 1, 2016, 7 pages.
Non-Final Office Action issued in U.S. Appl. No. 17/733,254, dated Sep. 27, 2022, 10 pgs.
Non-Final Office Action issued on U.S. Appl. No. 14/736,909, dated Apr. 4, 2018, 11 pages.
Non-Final Office Action issued on U.S. Appl. No. 16/106,831, dated Jul. 25, 2019, 6 pgs.
Non-Final Office Action issued on U.S. Appl. No. 16/596,549, dated Sep. 2, 2020, 7 pgs.
Notice of Final Rejection issued on Korean patent application No. 10-2016-7033626, dated Aug. 6, 2021, 9 pages.
Office Action issued on Brazilian patent application No. BR112014006930.1, received Nov. 8, 2019, 2 pages.
Office Action issued on Brazilian patent application No. BR112014006930.1, received Oct. 27, 2020, 3 pages.
Office Action issued on Chinese patent application No. 201680008875.3, dated Sep. 1, 2020, 22 pages.
Office Action issued on Chinese patent application No. 201680008875.3, received Sep. 19, 2019, 9 pages.
Office action issued on Indian patent application No. 201747027318, dated Apr. 12, 2021, 6 pages.
Office Action issued on Israeli patent application No. 253817, received Oct. 12, 2020, 4 pages.
Office Action issued on Japanese patent application No. 2017-541066, dated Feb. 18, 2020, 18 pages.
Office Action issued on Japanese patent application No. 2017-541066, received Oct. 8, 2019, 18 pages.
Non-Final Office Action issued in U.S. Appl. No. 17/186,156, dated Aug. 4, 2022, 14 pgs.
Office action issued on Korean patent application No. 10-2017-7024670, mailed May 24, 2022, 11 pages.
Preliminary Report on Patentability issued on PCT/US12/027841, received Oct. 10, 2013, 7 pgs.
Extended European Search Report issued on European patent application No. 12765455.6, dated Aug. 5, 2014, 9 pages.
Final Office Action from U.S. Appl. No. 17/524,777, dated Apr. 24, 2023, 18 pp.
Final Office Action issued on U.S. Appl. No. 15/900,232, dated Dec. 13, 2018, 15 pages.
Int. Search Report and Written Opinion of PCT Appln. No. US2012/54372, received Nov. 27, 2012, 15 pgs.
Non-final Office Action from U.S. Appl. No. 17/686,039, mailed May 10, 2023, 14 pp.
Non-final Office Action from U.S. Appl. No. 17/686,039, dated Jan. 4, 2024, 11 pp.
Non-Final Office Action issued on U.S. Appl. No. 16/197,748, Notification Date of Sep. 6, 2019, 9 pgs.
Office Action issued on Brazilian patent application No. BR1120140069263, received May 12, 2020, 2 pgs.
Office action issued on Brazilian patent application No. BR112014010028-4, dated May 17, 2022, 7 pages.
China National Intellectual Property Administration, Second Office Action issued in CN App. No. 201480057944.0, Dated Jul. 16, 2019, 21 pgs.
VCR Commander™ Service User's Guide, Scientific—Atlanta Inc. (2000), 28 pp.
Digital Video Recorder with TiVo, Spring and Fall 2001, Service Update Guide, 65 pgs.
Direct TV TiVo Installation Guide, Hughes Network Systems, 68 pgs.
EPO, examination report issued on European patent application No. 14801064.8, dated Jul. 11, 2019, 4 pages.
ETSI TS 102 006 v1 .3.1, (May 2004), Technical Specification, Digital Video Broadcasting (DVB); Specification for System Software Update in DVB Systems, European Broadcasting Union, 39 pgs.
European Patent Office, extended European Search Report issued on European patent application No. 12844121.9, dated Mar. 5, 2015, 6 pages.
European Patent Office, extended European Search Report issued on European patent application No. 14801064.8, dated Apr. 18, 2016, 8 pages.
European Patent Office, extended European Search Report issued on European patent application No. 14872863.7, dated Nov. 25, 2016, 8 pages.
Final Office Action issued on U.S. Appl. No. 15/900,342, dated Nov. 29, 2018, 19 pages.
HDMI Specification Version 1.3a, Hitachi, Lid., et al., Nov. 10, 2006, 2001-2006 by Hitachi, Lid., et al., 276 pgs.
High-Definition Multimedia Interface, HDMI Licensing, LLC, Specification Version 1.3a, Nov. 10, 2006, pp. 1-276.
In re reexam of U.S. Pat. No. 10,600,317 to Haughawout et al., For System and Method for Simplified SetUp of a Universal Remote Control, Declaration of Mr. John Tinsman Under 37 C.F.R. § 1.132, 122 pgs.
Int. Search Report and Written Opinion of the Int. Searching Authority issued on Int. Appln. No. PCT/US12/62161, received Jan. 23, 2013, 12 pages.
Int. Search Report and Written Opinion of the Int. Searching Authority issued on Int. Appln. No. PCT/US14/38151, received Jun. 27, 2014, 9 pages.
International Search Report and Written Opinion issued on PCT application No. US19/54315, dated Jan. 2, 2020, 16 pages.
ISA/KR, Int'l Search Report issued in Appln. No. PCT/US12/60390, dated Jul. 18, 2013, 4 pgs.
ISA/KR, Written Opinion issued in Appln. No. PCT/US12/60390, dated Jul. 18, 2013, 7 pgs.
User Interface—Infrared Learner {Remote Control), Application Note AN2092, Cypress Semiconductor, Document No. 001-41063, {Nov. 11, 2002), 7 pp.
Universal Electronics Inc., "Universal Electronics Teams up with Sensory to Deliver Smart Home Digital Assistant Platform with Embedded Voice Control and Branded Assistant Experience." Jan. 4, 2019 {Jan. 4, 2019) Retrieved on Aug. 19, 2022 {Aug. 19, 2022) from <https://universalelectronicsinc.gcs-web.com/news-releases/newselease-details/universal-electronics-teams-sensory-deliver-smart-home-digital>, 2 pp.

(56) References Cited

OTHER PUBLICATIONS

United States Court of Appeals for the Federal Circuit, In re: Universal Electronics, Inc., 2022-1757, Opinion filed for the court by Reyna, Taranto, and Stoll, Circuit Judges, Nonprecedential Opinion. Date entered/ received: Jun. 14, 2023, 4 pgs.
U.S. Appl. No. 61/680,876 to Arling et al.
Logitech Unveils Harmony 680 Remote: Maestro of the Living Room Media Center PC, Logitech NASDAQ:LOGI, 4 pgs.
Non-final Office Action from U.S. Appl. No. 17/686,180, mailed May 23, 2023, 13 pp.
Non-Final Office Action issued on U.S. Appl. No. 16/156,766, Notification Date of Oct. 4, 2019, 10 pgs.
Non-Final Office Action issued on U.S. Appl. No. 16/196,756, Notification Date of Sep. 6, 2019, 9 pgs.
Non-Final Office Action issued on U.S. Appl. No. 16/197,552, Notification Date of Sep. 19, 2019, 10 pgs.
Non-Final Office Action issued on U.S. Appl. No. 16/783,971, dated Sep. 2, 2020, 8 pgs.
Non-Final Office Action issued on U.S. Appl. No. 16/814,493, dated Feb. 19, 2021, 15 pgs.
Non-Final Office Action issued on U.S. Appl. No. 16/838,736 dated Mar. 18, 2021, 15 pgs.
Norme Internationale International Standard, CEI IEC 61883-1, First edition, Feb. 1998, Consumer audio/video equipment—Digital interface—Part 1 :General, Copyright International Electrotechnical Commission, Ref. No. EI/IEC 61883-1:1998, Order No. W2248667, 100 pgs.
Personal TV Owner's Guide, TiVo, Philips, 1999 by TiVo, Inc., USA, 153 pgs.
Petition for Inter Partes Review of U.S. Pat. No. 10,600,317, Case No. IPR2021-00263, *Roku, Inc.* v. *UEI, Inc.*, 94 pp.
Petition for Inter Partes Review of U.S. Pat. No. 10,600,317, Case No. IPR2021-00264, *Roku, Inc.* v. *UEI, Inc.*, 63 pp.
Philips, Directv, TiVo, Directv Receiver with TiVo Viewer's Guide, 154 pgs.
PocketRemote: Integrating a Universal Remote Control with a Handheld Computer, Angus Huang, Submitted to the Department of Electrical Engineering and Computer Science, Feb. 1, 2002, 2002 Angus Huang, 106 pgs.
RCA, Tivo Viewer's Guide, 1999, 2000 by TiVo, Inc., 96 pgs.
*Roku, Inc.*, v. *UEI, Inc.*, U.S. Pat. No. 10,600,317, Declaration of Margaret Schmidt, 7 pgs.
Sony, 2001 Home Network Products, SVR-2000 Digital Network Recorder, 2001 Sony Electronics Inc., 6 pgs.
Sony, 3-060-082-01 (1 ), Digital Network Recorder SVR-2000, Setup Guide, 2000 by Sony Corporation, Sunnyvale, CA, 94089, http://www.tivo.com, 68 pgs.
Sony, Digital Network Recorder, Installation Guide, SVR-3000, 2002 by Sony Electronics Inc., 58 pgs.
The Essential Guide to User Interface Design, Second Edition, An Introduction to GUI Design Principles and Techniques, Wilbert O. Galilz, Whiley Computer Publishing, John Wiley & Sons, Inc., 2002, 786 pgs. (Uploaded in eight parts).
Transcript of the Sep. 30, 2020 Deposition of Dr. Turnbull, 166 pp.
TiVo Installation Guide—Series 2 Digital Video Recorder, archived by web.archive.org on Aug. 12, 2004, with Affidavit of Elizabeth Rosenberg attached ("TiVo"), 88 pp.
U.S. International Trade Commission, Washington, D.C., In the Matter of Certain Electronic Devices, Including Streaming Players, Televisions, Set Top Boxes, Remote Controllers, and Components Thereof, Inv. No. 337-TA-1200, Initial Determination on Violation of Section 337 and Recommended Determination on Remedy and Bond, 154 pp.
Notice of Allowance issued in U.S. Appl. No. 17/665,219, dated May 16, 2023, 6 pgs.
Z-ZiLOG, Z90356 and Z90351, 64KWord Television 50 Controller With Expanded OSD Features, PB000102-1102, Product Brief and Product Block Diagram, 6 pgs., ZiLOG Worldwide Headquarters, San Jose, CA., zservice@zilog.com; www.zilog.com.

"Data Formats for IR Remote Controls," Vishay Semiconductors, Document No. 80071, Rev. A2, {Aug. 27, 2003), 5 pp.
2010 Spring BD-Players, BOP IP & RS-232 Control Version 1. 00. 00, Edited Dec. 8, 2010 {"Remote Code Commands Lisi") https:// www.pioneerelectronics.com/SlaticFiles/PUSA/Files/Home% 20Custom%20In ,tall/2010%20Pioneer"/o20BDP 330_IP &_RS-232_ Commands.pdf), 3 pp.
AT2400 AllTouch Remote Control User's Guide, Scientific Atlanta Inc., (2002), 2 pp.
Commission Decision in ITC-337-TA-1200, 45 pp.
Connecting the Explorer 8300HDTM Digital Video Recorder Manual, Scientific Atlantic Inc. (2005), 27 pp.
Declaration of Samuel H. Russ, PhD, 100 pp.
Expert Report of Dr. Craig Rosenberg from ITC-337-TA-1200 dated Nov. 19, 2020 (Redacted Relevant Pages—Non Confidential Version), 9 pp.
Extended European search report issued of European patent application No. 19871693.8 dated Jun. 14, 2022, 10 pages.
Extended European Search Report issued on European patent application No. 19908998.8, dated Sep. 27, 2022, 10 pages.
Extended European search report issued on European patent application No. 20909517.3, dated Jan. 5, 2022, 10 pages.
Extended European search report issued on European patent application No. 20910756.4, dated Dec. 20, 2022, 11 pages.
Extended European Search Report issued on European patent application No. 21217138.3, dated Apr. 7, 2022, 12 pages.
File History of U.S. Pat. No. 10,600,317 to Haughawout.
Final Office Action issued on U.S. Appl. No. 16/199,463, Notification Date of May 6, 2020, 14 pgs.
Final Office Action issued on U.S. Appl. No. 16/778,638, Notification date of Jul. 23, 2020, 6 pgs.
User Manual Harmony 900—Remote Control User Guide, Version 1.0, Logitech, 59 pp.
Infrared Data Association Serial Infrared Physical Layer Specification, Version 1.4, May 30, 2001, 1994, Infrared Data Association, 68 pgs.
Initial Determination in ITC-337-TA-1200, 154 pp.
Int. Search Report and Written Opinion issued on PCT application No. PCT/US22/33028, dated Oct. 14, 2022, 20 pages.
International CES 2000 Report—Universal Electronics Inc. (2000) http://www.remotecentral.com/ces2000/uei.hlm), 2 pp.
ITC Commission Opinion, Inv. No. 337-TA-1200, issued Dec. 3, 2021, 46 pp.
ITC Markman Order, Inv. No. 337-TA-1200, filed Oct. 1, 2020.
Logitech Harmony 900 Universal Remote Review, by David Rees, The Gadgeteer, User Review 2 (hllps://the-gadgeteer.com/2010/01/25/logitech-harmony-900-universal-remotereview/), 16 pp.
Michael Brown, Product Reviews—Logitech Harmony 900 Review, User Review 1 Sep. 14, 2009) {https://www.digitaltrends.com/gadget-reviews/logitech-harmony-900-review/), 18 pp.
Non-Final Office Action issued in U.S. Appl. No. 17/461,237, dated Aug. 17, 2022, 8 pgs.
Non-Final Office Action issued in U.S. Appl. No. 17/665,219, dated Feb. 16, 2023, 10 pgs.
Non-Final Office Action issued on U.S. Appl. No. 16/114,762, Notification Date of Feb. 14, 2020, 13 pgs.
Non-Final Office Action issued on U.S. Appl. No. 16/457,309, Notification Date of Mar. 6, 2020, 17 pgs.
Non-Final Office Action issued on U.S. Appl. No. 16/540,635, Notification Date of Feb. 24, 2020, 11 pgs.
Non-Final Office Action issued on U.S. Appl. No. 16/778,638, Notification Date of Mar. 6, 2020, 8 pgs.
Non-Final Office Action issued on U.S. Appl. No. 17/375,566, dated Jan. 21, 2022, 19 pgs.
Non-Final Office Action issued on U.S. Appl. No. 17/527,532, dated Feb. 10, 2022, 10 pgs.
Prosecution History of U.S. Patent No. 10,593, 196 to Arling, 459 pp.
Ex-Parte Qualye Office Action issued on U.S. Appl. No. 17/527,390, dated Feb. 3, 2022, 6 pgs.
Patent Owners Preliminary Response in IPR2021-00299, 63 pp.

(56) References Cited

OTHER PUBLICATIONS

Patent Owner Infringement Claim Chart of U.S. Pat. No. 10,593,196 marked Ex. 5 in ITC-337-TA-1200 (Redacted Relevant Pages—Non Confidential Version), 9 pp.
Final Office Action from U.S. Appl. No. 17/686,039, dated Oct. 3, 2023, 11 pp.
Office Action from EP application number 21217138.3, dated Mar. 19, 2024, 10 pp.
Non-final Office Action from U.S. Appl. No. 17/888,602, dated May 21, 2024, 20 pp.
Non-final Office Action from U.S. Appl. No. 17/887,624, dated Apr. 5, 2024, 32 pp.
Non-final Office Action from U.S. Appl. No. 18/233,192, dated Mar. 21, 2024, 17 pp.
Extended Search Report from European application number 22821119.9, dated Oct. 2, 2024, 13 pp.
Non-final Office Action from U.S. Appl. No. 17/887,624, dated Aug. 9, 2024, 32 pp.
Final Office Action from U.S. Appl. No. 17/888,602, dated Aug. 9, 2024, 21 pp.

* cited by examiner

SYSTEM AND METHOD FOR WIDGET-ASSISTED SETUP OF A UNIVERSAL REMOTE CONTROL

RELATED APPLICATION DATA

This application claims the benefit of and is a continuation of U.S. application Ser. No. 17/748,254, filed on May 19, 2022, which application claims the benefit of and is a continuation of U.S. application Ser. No. 15/986,489, filed on May 22, 2018, which application claims the benefit of and is a continuation of U.S. application Ser. No. 15/785,509, filed on Oct. 17, 2017, which application claims the benefit of and is a continuation of U.S. application Ser. No. 12/974,231, filed on Dec. 21, 2010, which application claims the benefit of U.S. Provisional Application Ser. No. 61/289,486, filed on Dec. 23, 2009, and claims the benefit of and is a continuation-in-part of U.S. application Ser. No. 11/515,962, filed on Sep. 5, 2006, which application in turn claims the benefit of U.S. Provisional Application Ser. No. 60/715,229 filed on Sep. 8, 2005, which applications are incorporated herein by reference in their entirety.

BACKGROUND OF THE INVENTION

This invention relates generally to remote control systems and, more particularly, to a system and method for setting up and configuring a universal remote control to command functions of one or more types of remotely controllable appliances of one or more manufacturers. Exemplary types of appliances include, but are not limited to televisions, video cassette recorders (VCRs), cable boxes, disk players, digital video recorders (DVRs), thermostats, game consoles, etc.

Manufacturers typically provide a remote control with an appliance and, as such, different appliance types of different manufacturers are often commanded with different remote controls. To minimize the number of individual remote controls a user requires, universal remote controls have been developed. Accordingly, universal remote controls for commanding various functions of various types of appliances of various manufacturers have become quite widespread. By way of example, universal remote controls are described in commonly assigned U.S. Pat. Nos. 4,959,810, 5,255,313 and 5,552,917.

In a common method of setting up a universal remote control, codes for commanding functions of an appliance are learned from a remote control supplied by the manufacturer with that appliance. The learned codes, which are stored within the universal remote control, are then available for subsequent transmission to the appliance. Alternatively, codes for commanding functions of appliances of various types and various manufacturers can be preprogrammed into the universal remote control. The user then interacts with the universal remote control to identify to the universal remote control which appliance(s) the user desires to command, i.e., the user manually enters an appliance or brand code, usually obtained from a tabulation in a printed user manual or the like, into the universal remote control and the universal remote control uses that user provided identity information to access those preprogrammed codes that are appropriate for commanding the identified appliance(s). In this regard, examples of known methods for performing an initial setup of an universal remote control may be found in, for example, the above mentioned U.S. Pat. No. 4,959,810 as well as U.S. Pat. No. 5,614,906, entitled "Method for Selecting a Remote Control Command Set," or U.S. Pat. No. 4,703,359 entitled "Universal Remote Control Unit with Model Identification Capability," each of which is incorporated herein by reference in its entirety.

An additional system and method for setting up a universal remote control is disclosed in U.S. Pat. No. 6,650,248.

While such known setup methods do work for their intended purpose, it has been seen that the process of setting up and configuring a universal remote control can be demanding, exacting, and generally frustrating for many users. For example, user manuals or other documents containing setup codes and entry instructions may be lost or misplaced, or may be superseded as brand and/or model names evolve, etc. Accordingly, a need exists for a simplified and more user friendly system and method for setting up and configuring a universal remote control.

SUMMARY OF THE INVENTION

In accordance with this need, the following describes a system and method for allowing a universal remote control to be easily setup and configured to command appliances of various types and various manufacturers. In certain exemplary embodiments presented herein, such set up and configuration methods may be facilitated via the use of a networked appliance, for example a cable or satellite set top box, an Internet-enabled TV, etc., as an intermediary. For example, such a system and method for enabling set up of a controlling device capable of controlling a plurality of appliances may provide an interactive instruction set and associated programming, i.e., a widget, which is downloadable to a controllable appliance having an associated display, such as an Internet enabled television. The programming is accessible by the controllable appliance and is configured to appropriately display interactive instructions from the interactive instruction set to a user during a user initiated set up procedure for setting up the controlling device to communicate commands to another controllable device (e.g., a DVD, VCR, DVR, etc).

A better appreciation of the objects, advantages, features, properties, and relationships of the system and method for setting up and configuring a universal remote control will be obtained from the following detailed description and accompanying drawings which set forth illustrative embodiments which are indicative of the various ways in which the principles of the system and method may be employed.

BRIEF DESCRIPTION OF THE DRAWINGS

For use in better understanding the exemplary systems and methods for setting up a universal remote control which are described hereinafter, reference may be had to preferred embodiments shown in the following drawings in which.

DESCRIPTION OF THE INVENTION

Figure 1:
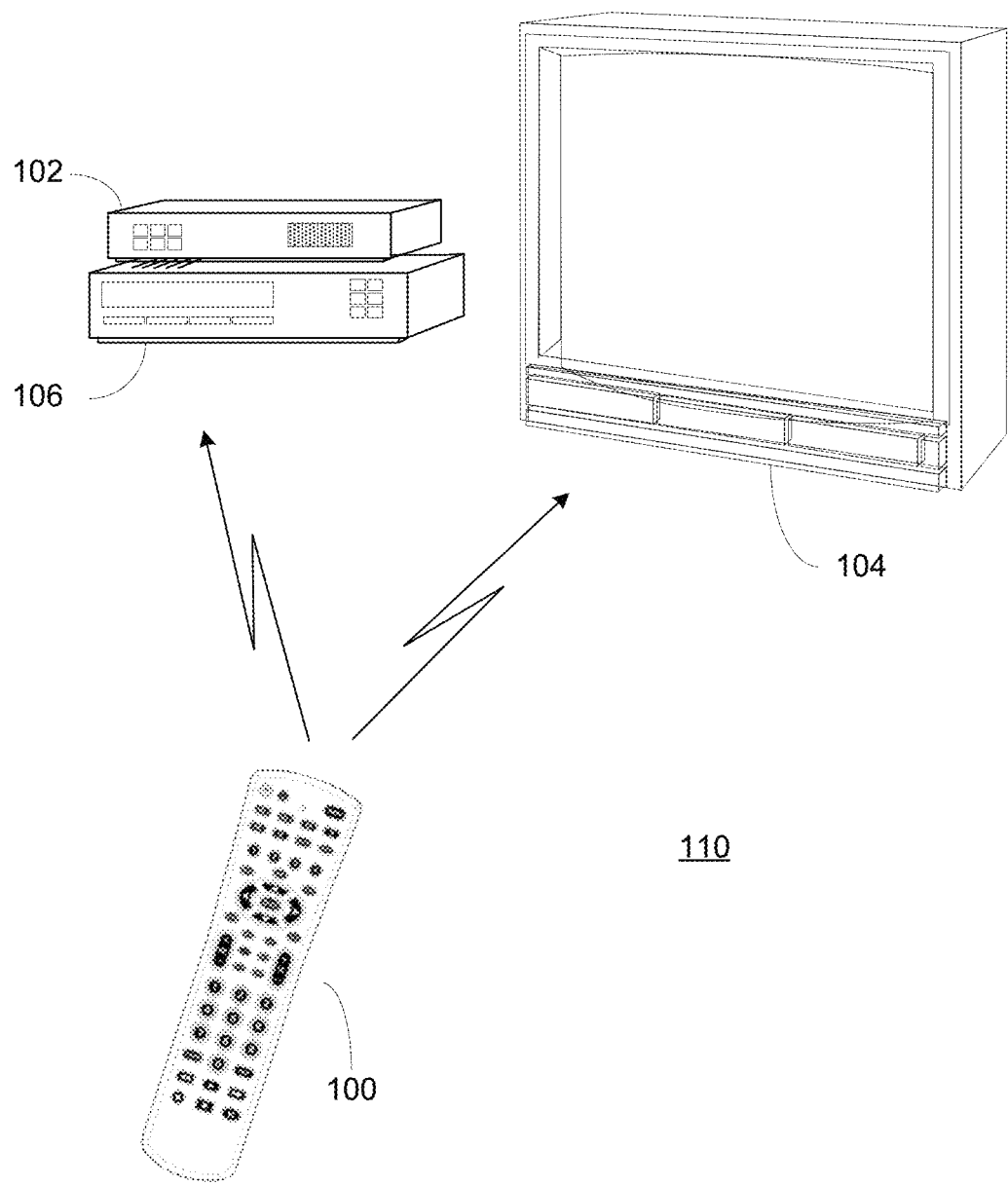
FIG. 1 illustrates an exemplary system in which a universal remote control may be used.

The following describes a system and methods for setting up and configuring a universal remote control to command one or more functions of one or more types of appliances of one or more manufacturers. By way of example, FIG. 1 illustrates an exemplary system 110 wherein a universal remote control 100 supplied together with a cable set top box 102 may be used to command functions of various appliances, illustrated as a TV set 104 and a VCR 106.

Figure 2:
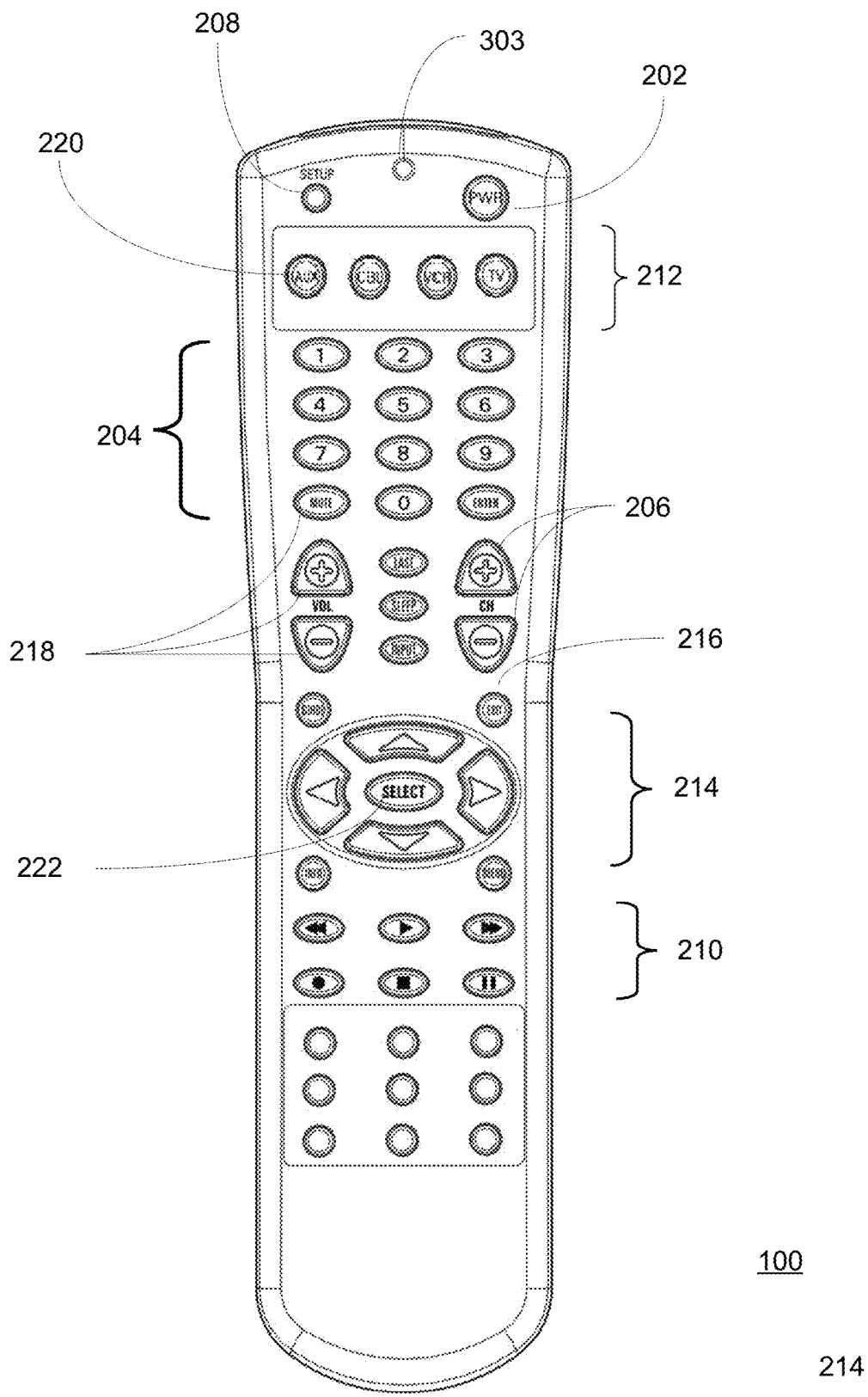
FIG. 2 illustrates a top view of an exemplary universal remote control for use in the system of FIG. 1.

For use in remotely commanding a device to perform a common and/or extended operational function (i.e., a function that may not be widely supported by devices of a common device type), the universal remote control 100, an example of which is illustrated in FIG. 2, includes a set of command keys within a key matrix which are assigned to operational functions. In this regard, common operational functions include functions that are usually widely supported by devices of a common device type (e.g., power 202, digit tuning 204, volume control 218, channel up/down control 206, media transport 210, etc.) The universal remote control 100 also includes device keys 212, e.g., "AUX," "CBL," "VCR," and "TV," the activation of which places the universal remote control 100 into a mode to transmit commands to a particular type of device, and a setup key 208. It will be appreciated that, while illustrated as hard keys, in other embodiments some or all of the keys of the universal remote control 100 may implemented as soft keys, for example, by being displayed on an LCD touch screen or the like.

Figure 3:
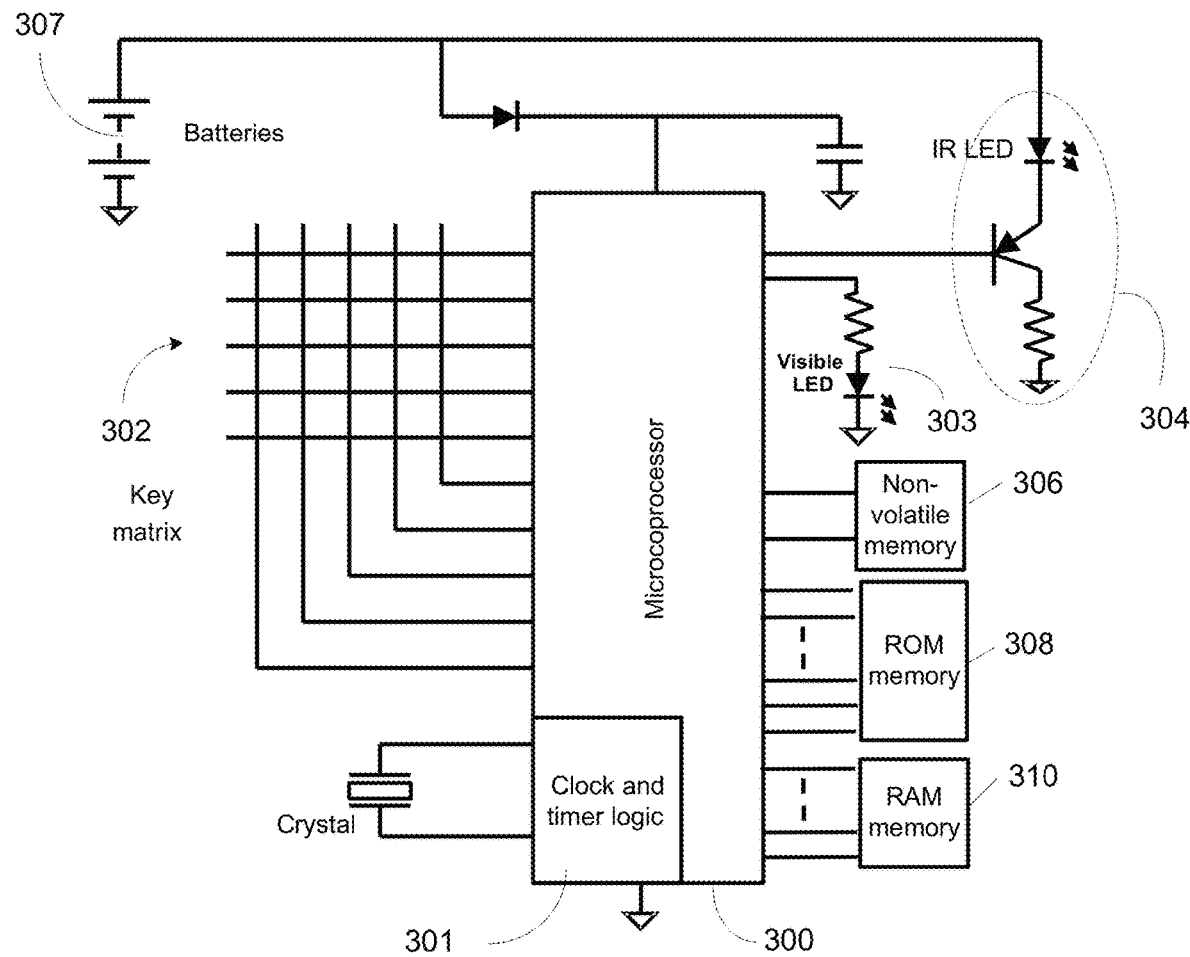
FIG. 3 illustrates a block diagram view of various components of the exemplary universal remote control of FIG. 2.

By way of further example, referring to FIG. 3, the universal remote control 100 may include, as needed for a particular application, a processor 300 coupled to one or more memory devices (such as a ROM memory 308, a RAM memory 310, and/or non-volatile read/write memory 306), a key matrix 302 (e.g., physical buttons, a touch screen display, or a combination thereof), an internal clock and timer 301, transmission circuit(s) 304 (e.g., IR and/or RF), receiver circuit(s) and/or transceiver circuit(s) (e.g., IR and/or RF—not illustrated), a means 303 to provide visual feedback to the consumer (e.g, LED, display, and/or the like), means to provide audio feedback to the user (e.g., a speaker—not illustrated), a power supply 307, and/or a serial I/O port (e.g., a jack or contacts—not illustrated). As will be understood by those of skill in the art, the memory device(s) includes executable instructions that are intended to be executed by the processor 300 to control the operation of the universal remote control 100. In this manner, the processor 100 may be programmed to control the various electronic components within the universal remote control 100, e.g., to monitor the power supply 307, to cause the transmission of signals, display icons and/or HTML pages, etc. The non-volatile read/write memory 306, for example, an EEPROM or the like, may be provided to store setup data and parameters as necessary such that data is not required to be reloaded after battery changes. It is to be understood that the memory devices may take the form of any type of readable media, such as, for example, a Smart Card, memory stick, a chip, a hard disk, a magnetic disk, and/or an optical disk. Still further, it will be appreciated that some or all of the illustrated memory devices may be physically incorporated within the same IC chip as the microprocessor 300 (a so called "microcontroller") and, as such, they are shown separately in FIG. 3 only for the sake of clarity.

To cause the universal remote control 100 to perform an action, the universal remote control 100 is adapted to be responsive to events, such as a sensed consumer interaction with the key matrix 302, receipt of a transmission, etc. In response to an event appropriate instructions and/or data within the memory devices are executed and/or accessed. For example, when a command key is activated on the universal remote control 100, the universal remote control 100 may retrieve a code data value corresponding to the activated command key from a memory device and access instructions to transmit the retrieved code data value to a device in a format recognizable by the device. It will be appreciated that the instructions within the memory devices can be used not only to cause the transmission of command codes and/or data to the devices but also to perform local operations. While not limiting, local operations that may be performed by the universal remote control 100 include displaying information/data, favorite channel setup, macro button setup, command function key relocation, etc. Since examples of local operations can be found in U.S. Pat. Nos. 5,481,256, 5,959,751, and 6,014,092 they will not be discussed in greater detail herein.

To initially program the universal remote control 100 to access the operational functions of a device, the consumer may use an improved system and method for obtaining, entering, and testing device code information, one exemplary embodiment of which is described hereafter.

Figure 4:
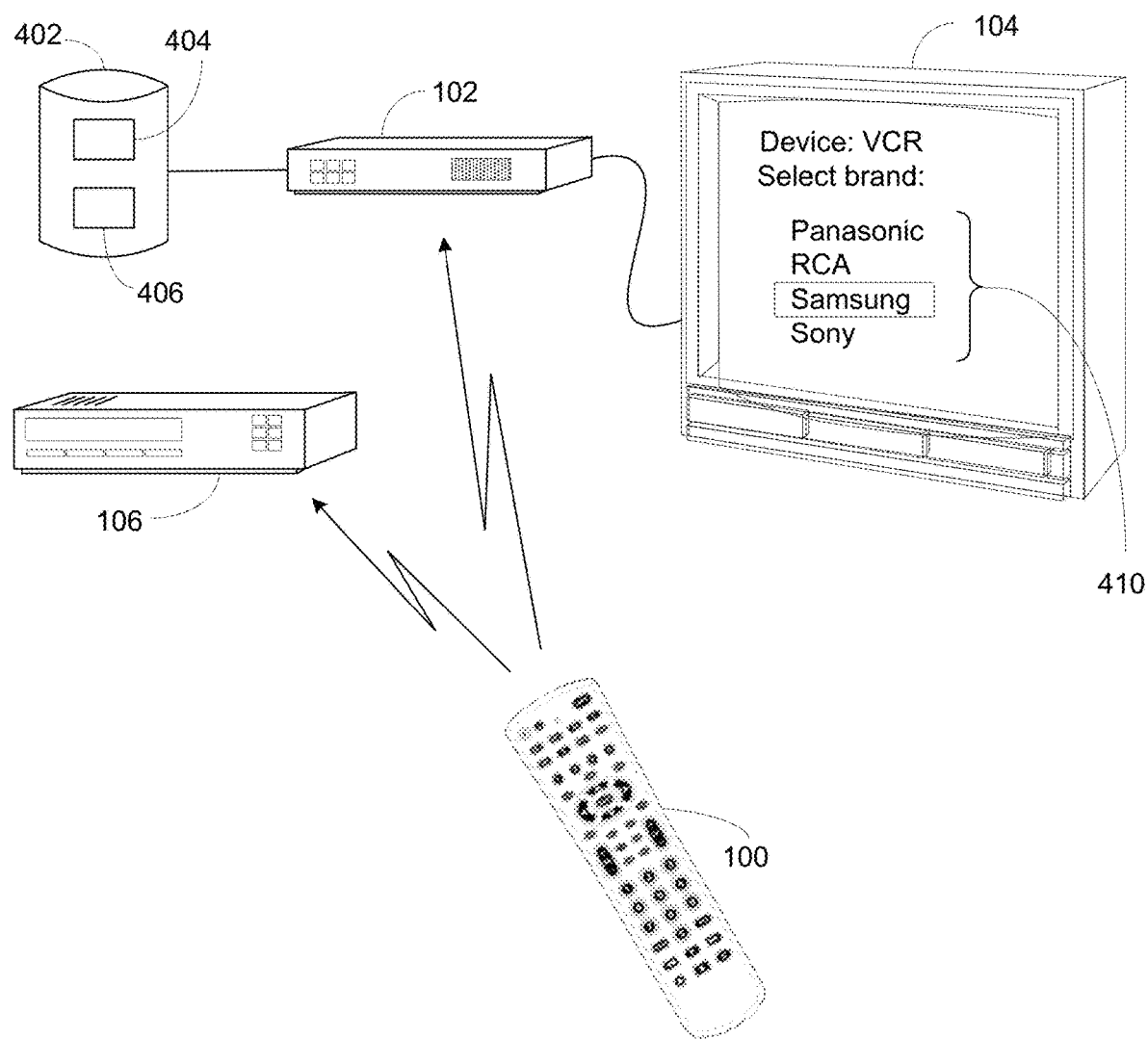
FIGS. 4 through 6 illustrate the system of FIG. 1 at various stages during initial setup of the exemplary universal remote control.

Turning now to FIG. 4, in an exemplary embodiment a remote control 100 may be supplied together with a cable or satellite set top box ("STB") 102. Remote control 100 may include a universal library of infrared codes for use in controlling other types of appliances which are commonly utilized in conjunction with a set top box, such as for example a TV 104 and/or a VCR 106. To facilitate setting up remote control 100 to command operation of appliances 104, 106, STB 102 may be equipped with data 404 and application program 406, preferably stored locally within STB 102 on mass storage 402 or on a device otherwise accessible to STB 102. It will be appreciated that mass storage 402 may take the form of flash memory, ROM memory, RAM memory, memory card or stick, hard disk drive, CD ROM, etc., or any combination of the above as appropriate. It will be further appreciated that data 404 and application 402 may be periodically updated over the cable network and/or may in certain embodiments even be partially or fully resident at the cable headend or other remote source accessible by STB 102. The data 404 and application 402 may also be updated using a device other than the STB 102. For example, if the data 404 and application 402 are maintained on removable memory, the removable memory may be updated via a personal computer or other device with an Internet connection and then replaced into the STB 102. It should also be appreciated that while the exemplary embodiment below is presented in terms of interactions between a remote control 100 and an application 402 resident in an STB, in alternative embodiments application 402 may be hosted on, and the interactions may occur with, any suitable appliance such as a TV, DVR, AV receiver, etc. without limitation.

Figure 7:
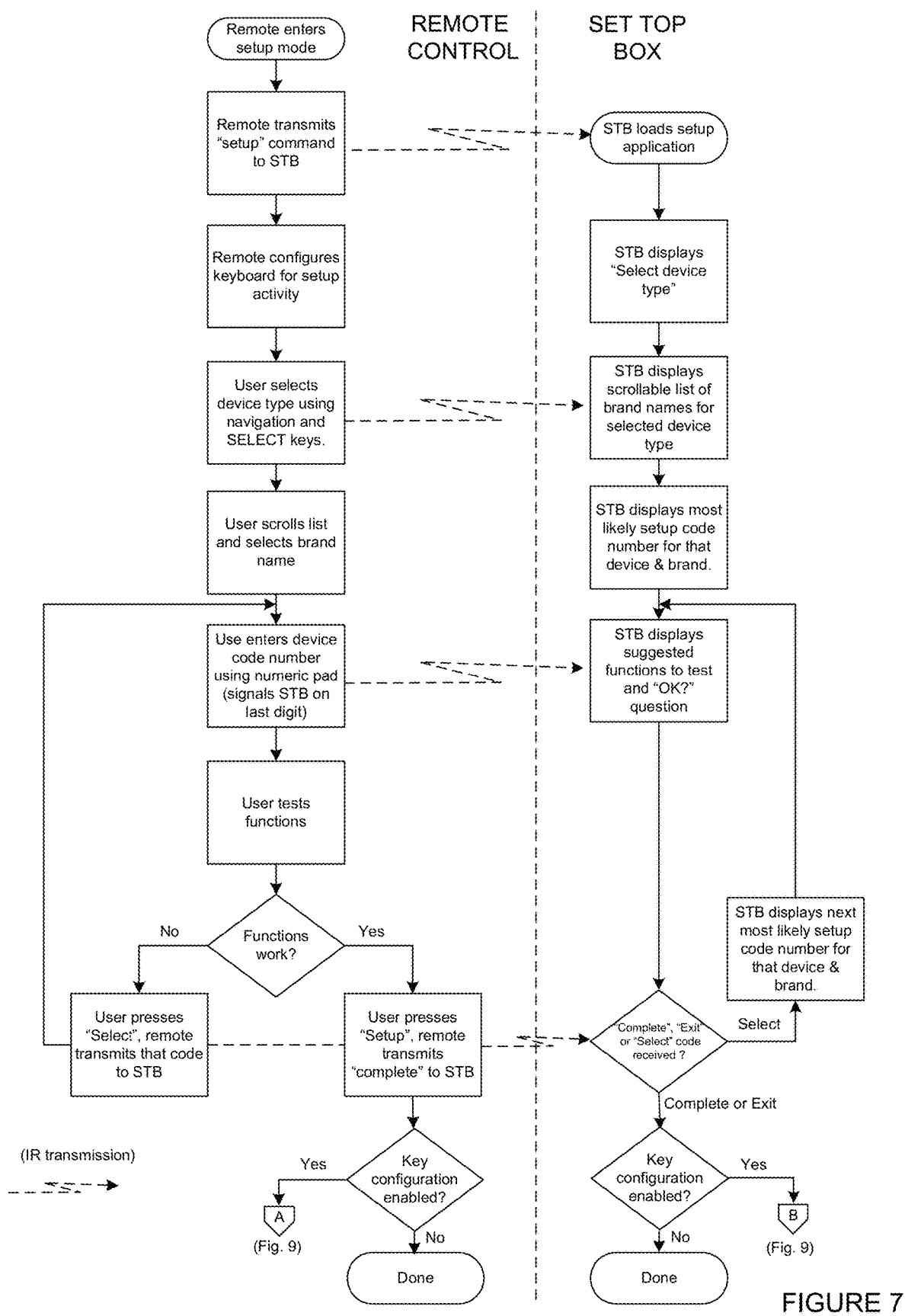
FIG. 7 illustrates, in flow chart form, the steps performed during initial setup of the exemplary universal remote control.

Application 406 is responsive to IR signals issued by remote control 100 during the user setup process as illustrated in the flowchart of FIG. 7 and described below:

The user enters a Setup Mode by, for example, pressing and holding setup key 208. The entering of the Setup Mode may be signaled to a user by the LED 303 blinking twice (e.g., upon pressing and holding the setup key for approximately 3 seconds). Upon entering Setup Mode the remote control transmits a specific "setup" IR code to STB 102 which is interpreted as a command to initiate the "Remote Setup/Help" application 406. Alternatively or as a backup, in certain embodiments application 406 may also be invoked from STB 102's built-in menu system, upon activation of a dedicated key on the STB 102, etc.

In connection with entering the setup mode, the remote control 100 may configure its keyboard as follows:

Navigation (Left, Right, Up, Down and Select/OK keys) 214, Exit key 216, and device keys 212 are adapted to cause transmission of infrared command data in the format recognized by STB 102;

Digit entry keys 204 do not transmit commands but serve only for input of appliance setup codes as described hereafter; and Function keys such as volume 208, channel up/down 206, transport keys 210, etc. are adapted to cause transmission of infrared command data in the format of the appliance under test as described hereafter.

Figure 5:
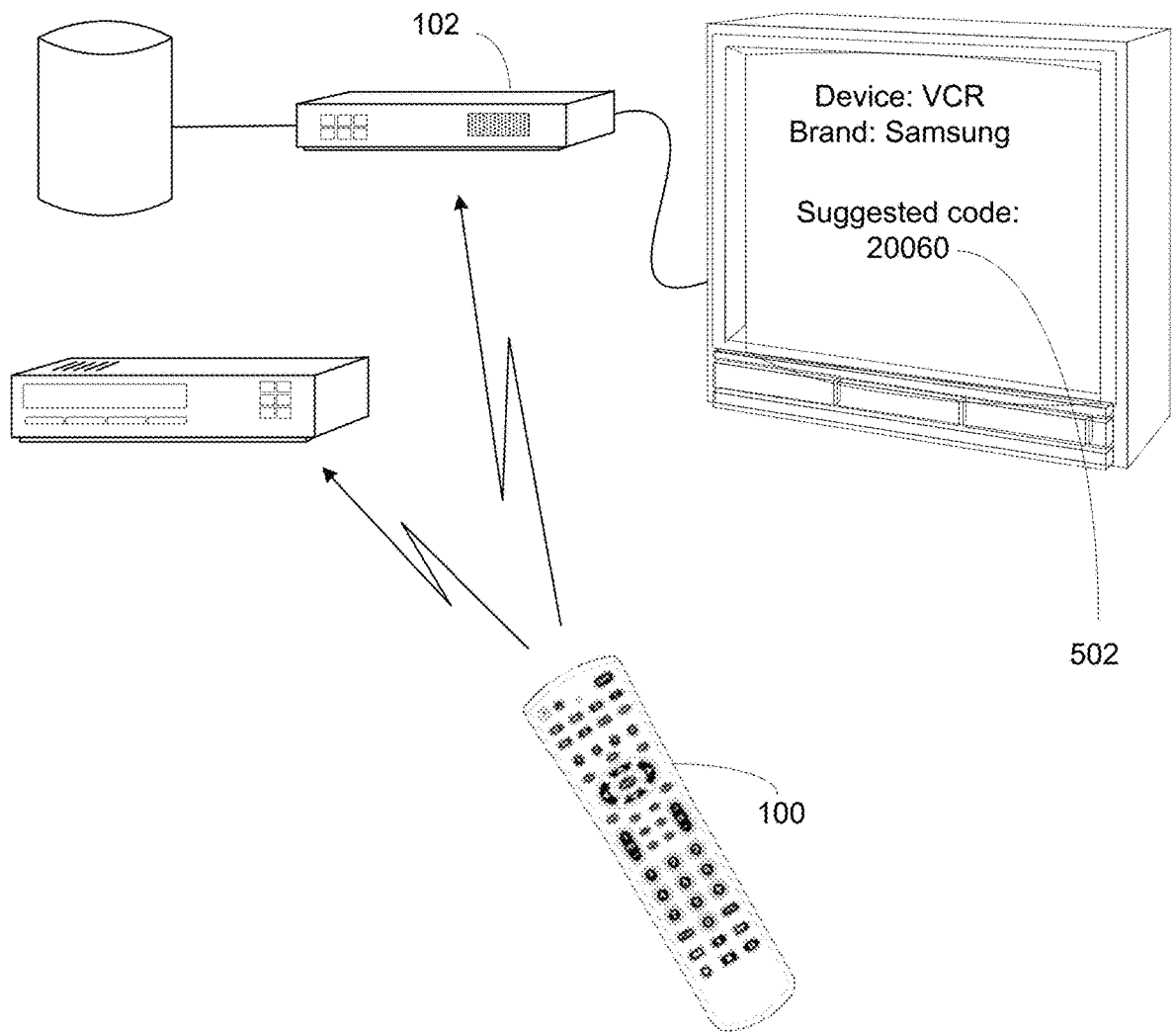

In connection with the following paragraphs, the reader may wish to refer to FIG. 7 which presents, in flowchart form, a summary of the steps described below and illustrated in FIGS. 4 through 6. Upon initiation, STB application 406 may display on TV 104 a user prompt such as for example: "What device do you want to setup for control?" together with a list of valid device types, e.g. "TV", "VCR", "Receiver", etc. The application 406 may also prompt the user to select an appropriate language for the prompts. Application 406 may additionally display messages for general user guidance such as for example "Press Exit at any time to exit remote setup and return to watching TV."

In the exemplary embodiment the user may then select, using navigation keys 214, a desired device type from the displayed list, for example "VCR." In an alternative embodiment, the user may directly select the device type by actuating one of the device keys 212 of the remote control, which may in that instance be adapted to transmit a signal to the STB indicative of the device type selected. Application 406 may respond by displaying a confirmation of the selected device type together with scrollable list 410 of valid brand names for that device type, as illustrated in FIG. 4. The brand names that comprise this list are obtained by reference to data file 404. In this way it will be understood that certain keys or groups of keys on remote control 100 may be temporarily reconfigured (generally during the setup procedure) to transmit command data to STB for purposes of user interaction with application 406 during the setup process.

The user may then select (once again via use of keys 214) a desired brand name, for example "Samsung." Application 406 may respond by displaying the remote control setup code number most likely to result in selection of an infrared code set which will operate appliances of the type and manufacture indicated (once again, obtained by reference to data 404). In the exemplary embodiment presented, this number may include a leading digit to indicate to the remote control programming which device type is to be setup, e.g. "2" for "VCR". In alternative embodiments where the user may already have explicitly entered the device type being set up via one of the keys 212, this may not be necessary.

The user may then enter this number, for example "2" "0" "0" "6" "0" (502 in FIG. 5), into remote control 100 using digit entry keys 204. Upon entry of the final digit of the sequence, remote control 100:

Configures itself to transmit commands in the indicated infrared command format in response to actuation of function keys 206, 208, 210, etc., and Transmits an infrared command in STB format to notify the STB application 406 that device code entry is complete.

Figure 6:
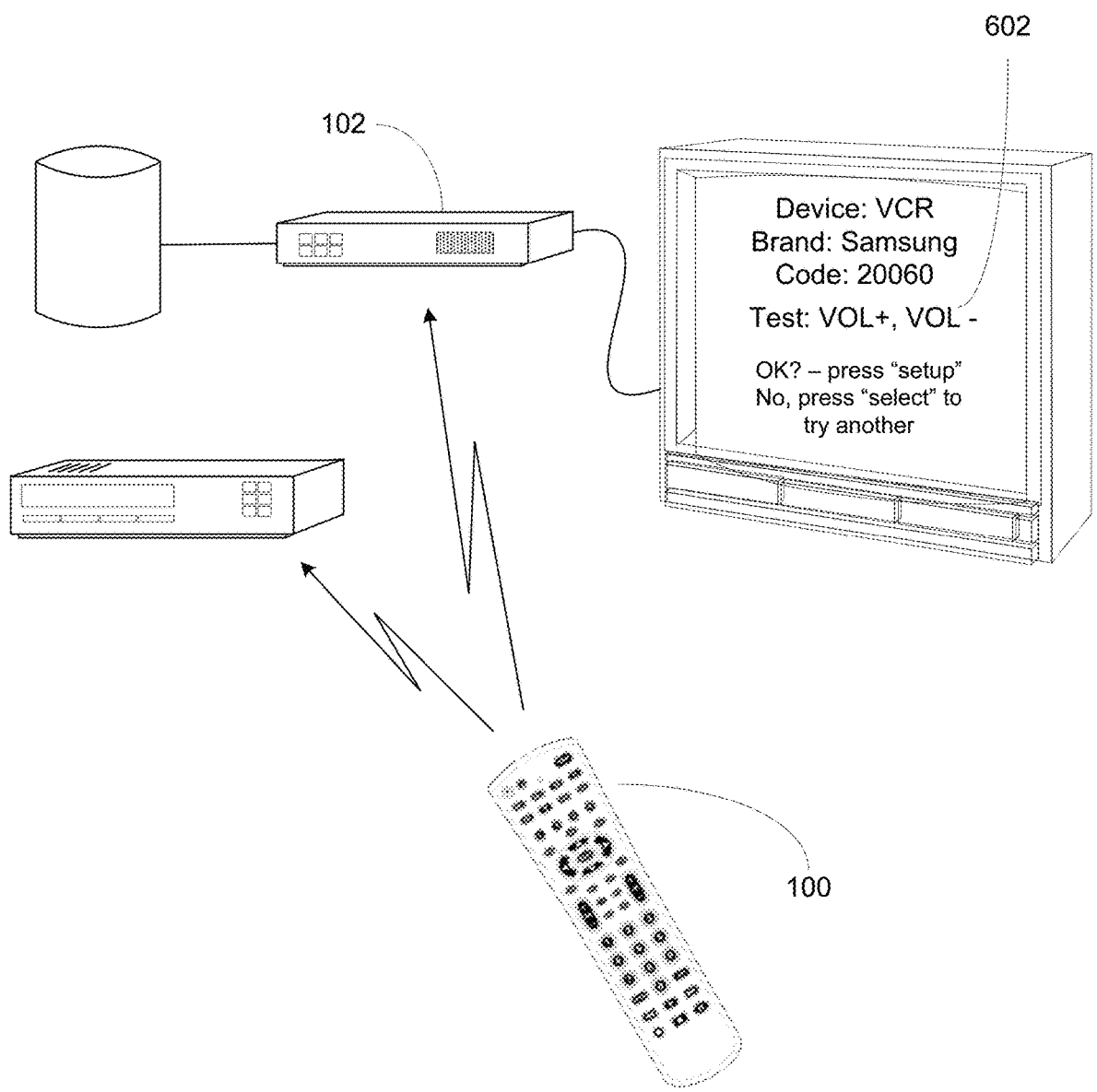

Upon receipt of the completion signal from remote control 100, STB application 406 may display a listing of suggested function(s) 602 to test operation of the target appliance using the code just entered, together with a user message to, for example, press "setup" if the suggested code works, or to press "select" to try a different code, all as illustrated in FIG. 6.

If the user activates the "setup" key, indicative that the current code being tested has been found suitable to command operation of the appliance, remote control 100 again transmits a completion signal in STB infrared format, which is interpreted by application 406 in STB 102 as a successful conclusion of the setup process and causes application 406 to terminate execution, returning STB 100 to normal operation. Likewise, remote control 100 also returns to normal operation, configured now to issue commands in the chosen format that device type (VCR in the example presented) is selected by activation of one of keys 212.

If on the other hand, the user activates the "select" key, indicative that the current code being tested is unable to command operation of the appliance, remote control 100 transmits the "select" command signal in STB infrared format, which causes application 406 to retrieve and display the next most likely setup code number contained in data 404, so that the user may repeat the test steps using this new code. This setup process may continue until the user finally exits by activating the "setup" or "exit" key, or alternatively, data 404 may include an indicator that no further possibilities exist, upon eventual retrieval of which application 406 may cause a display of instructions to the user to abort the setup process by pressing the "exit" key and, for example, call a customer service number.

In an alternate embodiment, application 406 may be configured to monitor command data transmitted from remote control 100 during the setup process for use in automatically progressing through the various setup instructions and prompts associated with the setup application. By way of example only, application 406 may be configured to monitor command data transmitted from remote control 100 in order to echo key presses on the TV screen as a means of visual verification to the user that a setup code was entered correctly, or to present prompts such as "Did your DVD player respond to the Power On command? Press "1" for yes, or press "0" for no" whereupon receipt of either the "1" or "0" key command data will cause application 406 to proceed automatically to another instruction or prompt in the setup procedure.

In certain embodiments, after the appropriate command code sets for the devices to be controlled have been selected as described above, it may be desirable to further configure certain operational characteristics of remote control 100. In particular, as described for example in U.S. Pat. No. 6,947, 101 or 7,013,434 (both of like assignee and incorporated herein by reference in their entirety) it may be advantageous to assign certain subsets of the keys of remote control 100 to always transmit command codes corresponding to a specific device. As appropriate for a particular embodiment, this may take the form of a fixed assignment of certain keys to always send the same code regardless of the device currently selected via device keys 212 (as described in the aforementioned U.S. Pat. No. 6,947,101) or this may take the form of a separate special page or device mode (e.g. "Home Theater mode") comprised of a composite of groups of key functions from other device modes (as described in the aforementioned U.S. Pat. No. 7,013,434), or some combination thereof. For example, users whose equipment is configured to route all audio signals through their a/v receiver may wish to have the volume keys 208 of exemplary remote control 100 always transmit commands that are intended to control corresponding operations of the receiver (i.e., the device code setup on the AUX mode key 220). Cable or satellite subscribers may wish to have the channel tuning keys 206 and numeric pad 204 always transmit commands that are intended to control corresponding operations of the STB (it will be appreciated that remote controls which are supplied together with a STB may already be factory pre-configured in this manner, however remote controls offered as aftermarket accessories and/or supplied together with other appliances may not be.)

Figure 8A:
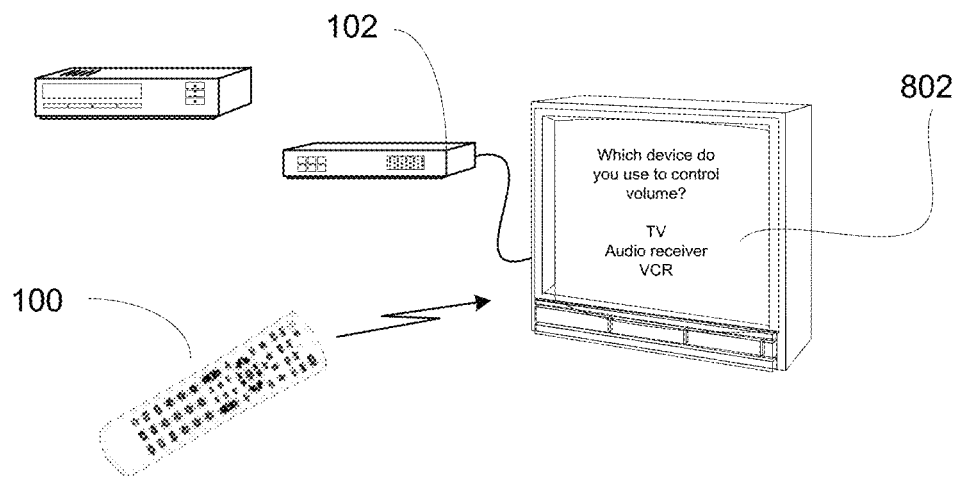
FIGS. 8A-8C illustrate the system of FIG. 1 at various stages during an exemplary key mapping setup of the exemplary remote control.
Figure 8B:
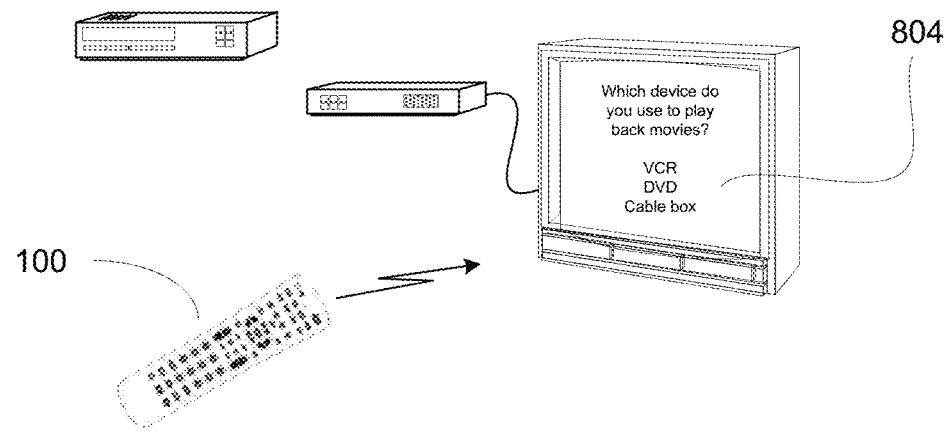
Figure 8C:
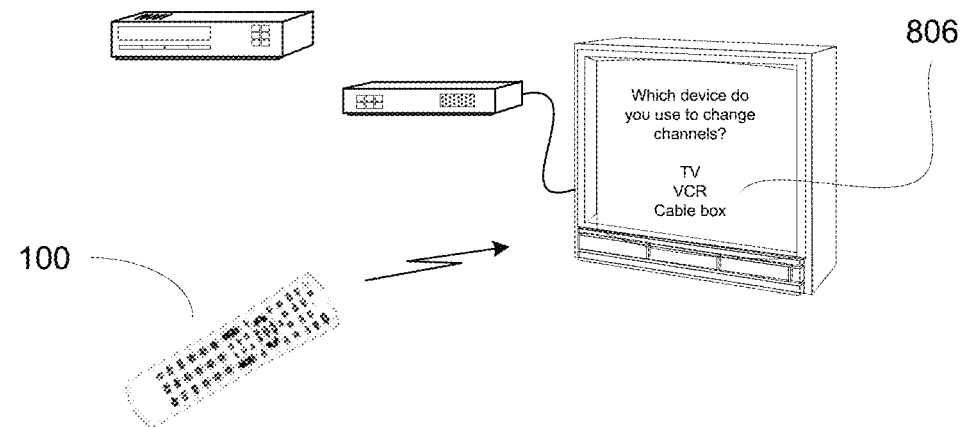
Figure 9:
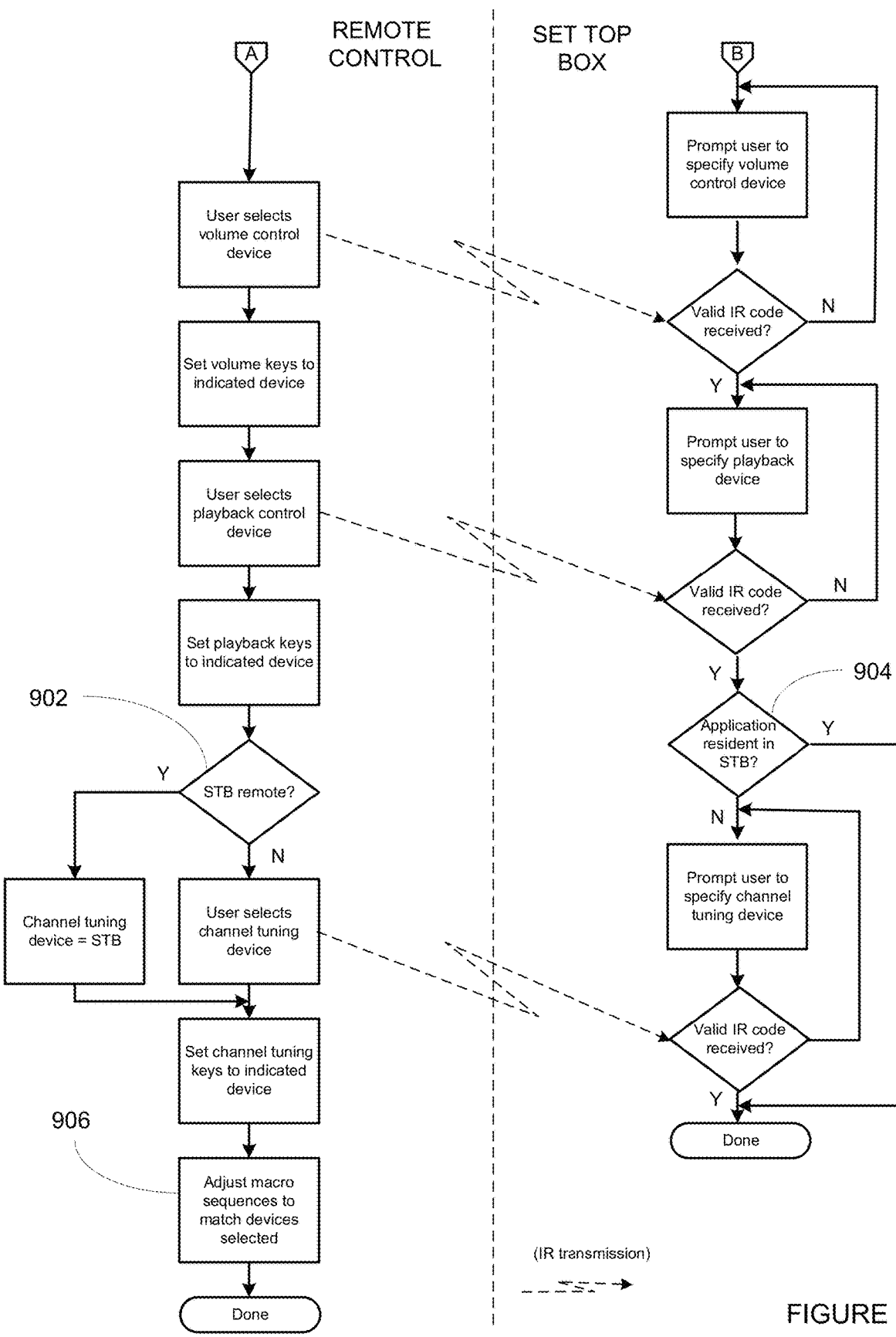
FIG. 9 illustrates, in flow chart form, the steps performed during key mapping setup of the exemplary remote control.

To this end, upon completion of device setup, application 406 may interactively prompt the user to enter information regarding device usage and system configuration, which information may then be used to configure key assignments, automatically program macro command sequences such as "all on", "all off", "watch a movie", etc., or for any other appropriate remote control configuration purpose. An exemplary method for performing key mapping is illustrated in FIGS. 8A-8C and summarized in flowchart form in FIG. 9. By way of this example, upon initiation of this particular setup operation, which may be initiated in a manner similar to that described above, application 406 may display on TV 104 a message 802 requesting that the user indicate to the remote control which device is normally used for controlling system volume. In the example presented, the choices 803 are TV, audio receiver, or VCR. Without limitation, this list may include all device types supporting the operation for which is setup is desired, be limited to those device types that the system has learned, through the initial configuration process, are to be controlled via the remote control, etc. The user may then indicate to the remote control which of the listed devices is to be used for this operation by activation of an appropriate one of the device keys 212 ("TV", "Aux" or "VCR" in this instance). Activation of a device key may then cause the remote control 100 to set it's internal key mapping for volume control (i.e., the command codes which are to be transmitted by the volume and mute keys 208 during normal operation) to match the device indicated. Remote control 100 may also transmit a specific command code to STB 102 indicating that a volume selection has been made. Receipt of this command by the STB may cause application 406 to display the next user prompt 804 on TV 104, requesting user selection of the device usually used for movie playback. In a similar manner, a user selection of playback device may be performed. With reference to the flowchart of FIG. 9 (902, 904), in systems where remote control 100 was supplied in conjunction with STB 102 and application 406 is resident in the STB, the step of selecting a channel tuning device may be bypassed since in this instance it is the STB by default. In other situations, the user may be prompted 806 to specify a device to be used for channel tuning, once again in a similar manner to that previously described. Upon completion of this stage of the setup process, in certain embodiments remote control 100 may also adjust 906 macro command sequences (such as "all on" or "all off", or activity initiating macros such as "watch a movie") as required by the newly-entered device preferences.

It will be appreciated that all or part of data 404 and/or application 406 may be downloaded into STB 102 (or other application host device as appropriate) from a cable or satellite headend, the internet, the PSTN, etc., as is well known in the art, either as a periodic update or on demand when the remote control setup feature is invoked. In this manner, the data used to guide the user through the setup process may be refreshed whenever new or revised brand names or cross references occur, to allow for language expansion, etc. Further, in situations where multiple remote control models or revisions have been offered by a supplier of the STB or other host device, alternative data sets 404 may be downloaded, for example based on user response to an initial screen displaying images of the various remote control versions, on an identifying signal transmitted by the remote control to be configured, etc.

Figure 10:
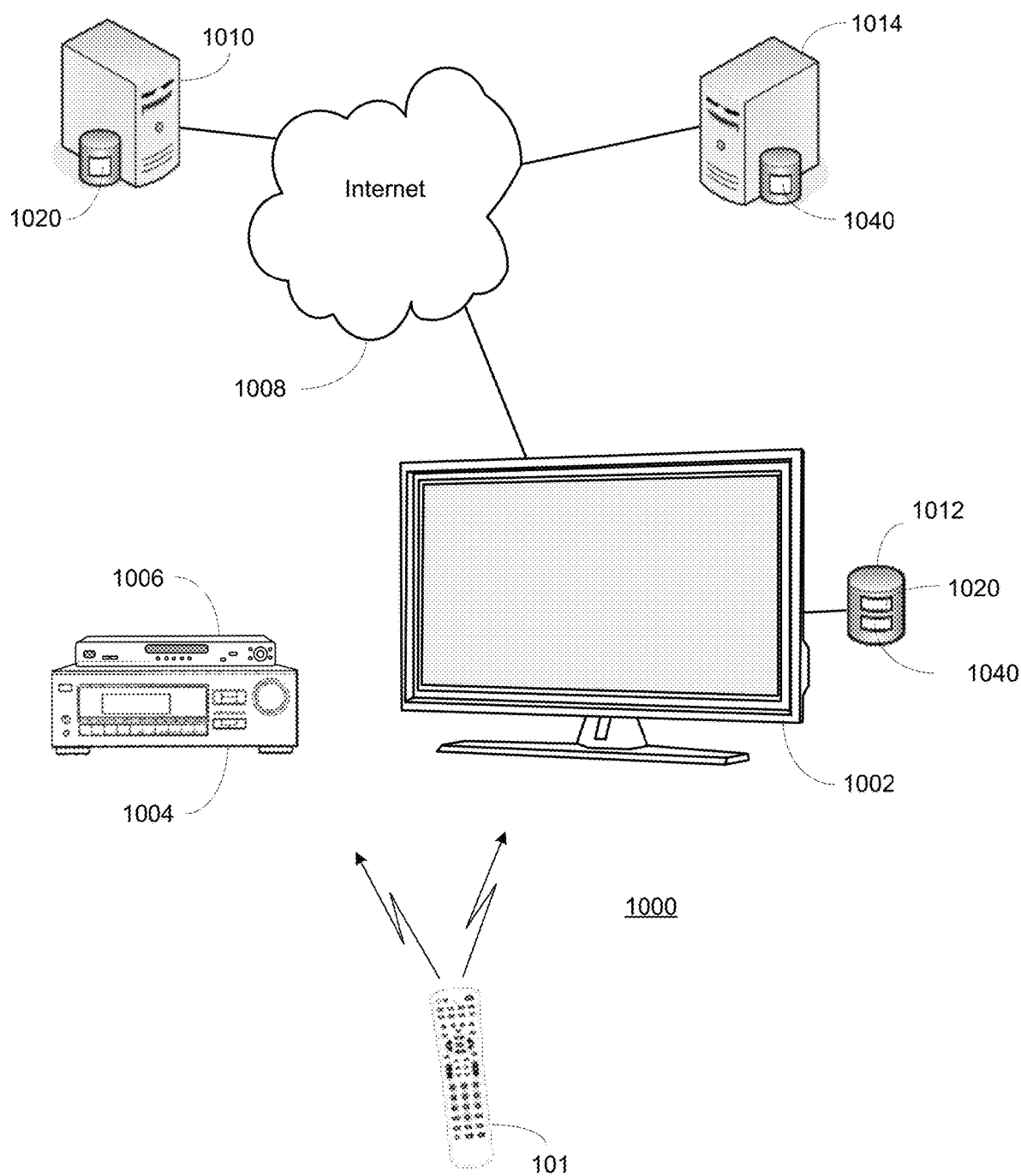
FIG. 10 illustrates a second exemplary system in which a universal remote control may be used.
Figure 11A:
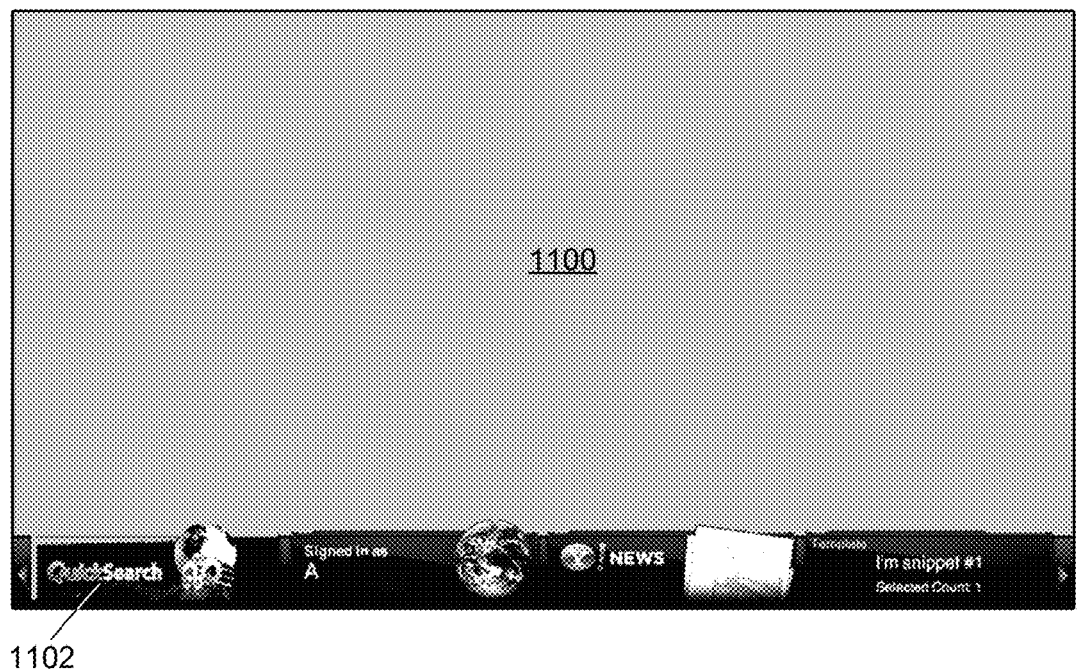
FIGS. 11A through 11D illustrate exemplary screen displays of an Internet-enabled TV when used in connection with setting up the universal remote control of FIG. 10.
Figure 11A:
Figure 11B:
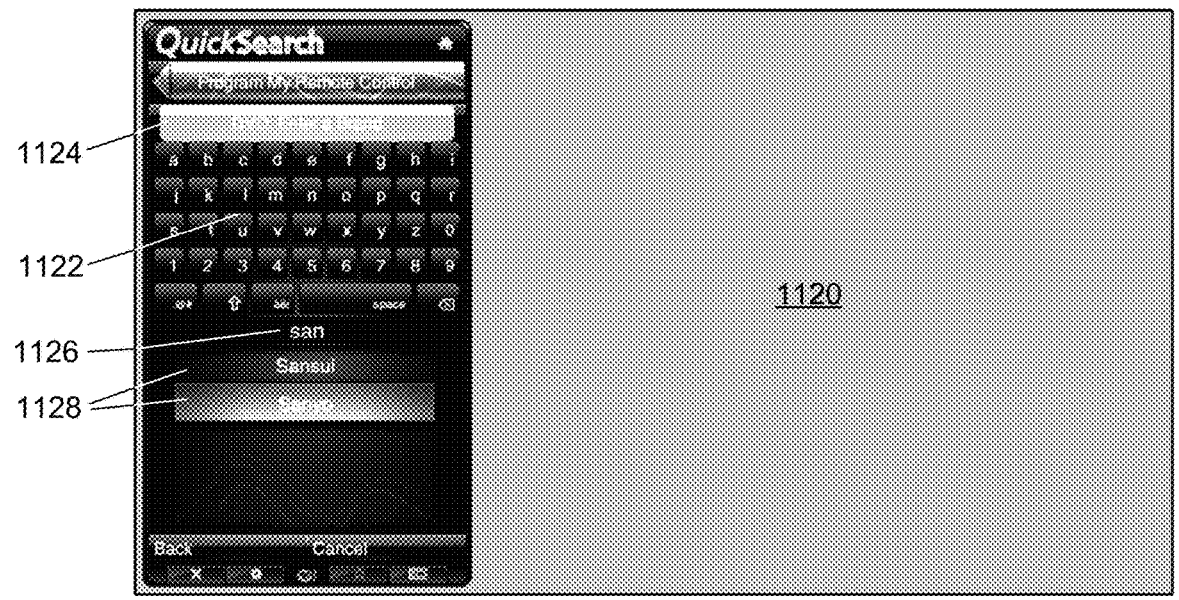
Figure 11B:
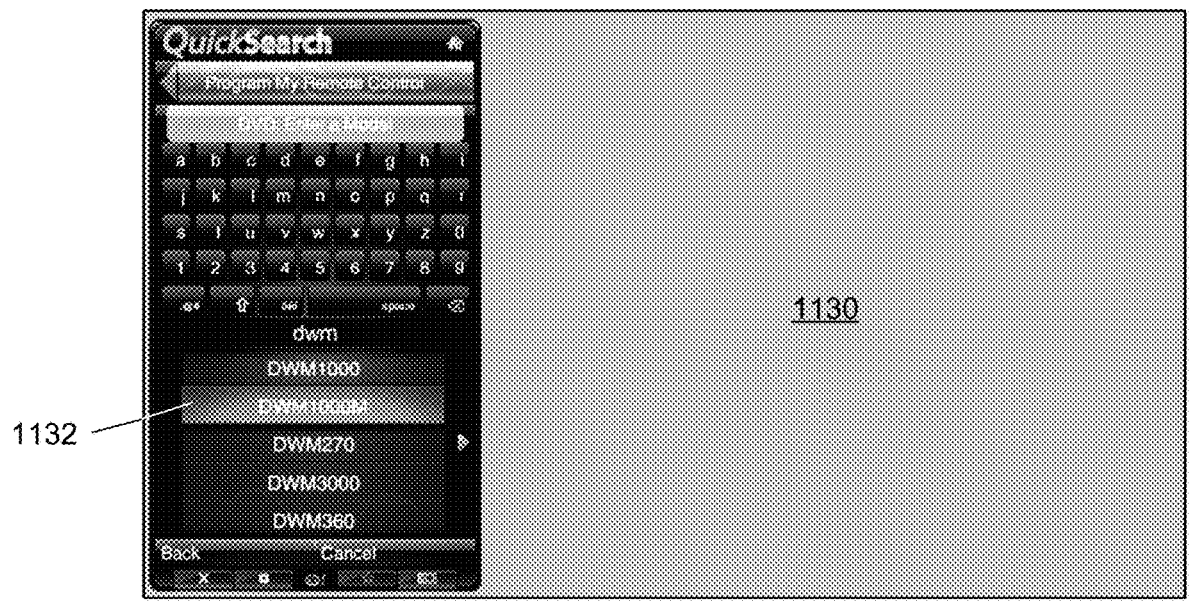
Figure 11C:
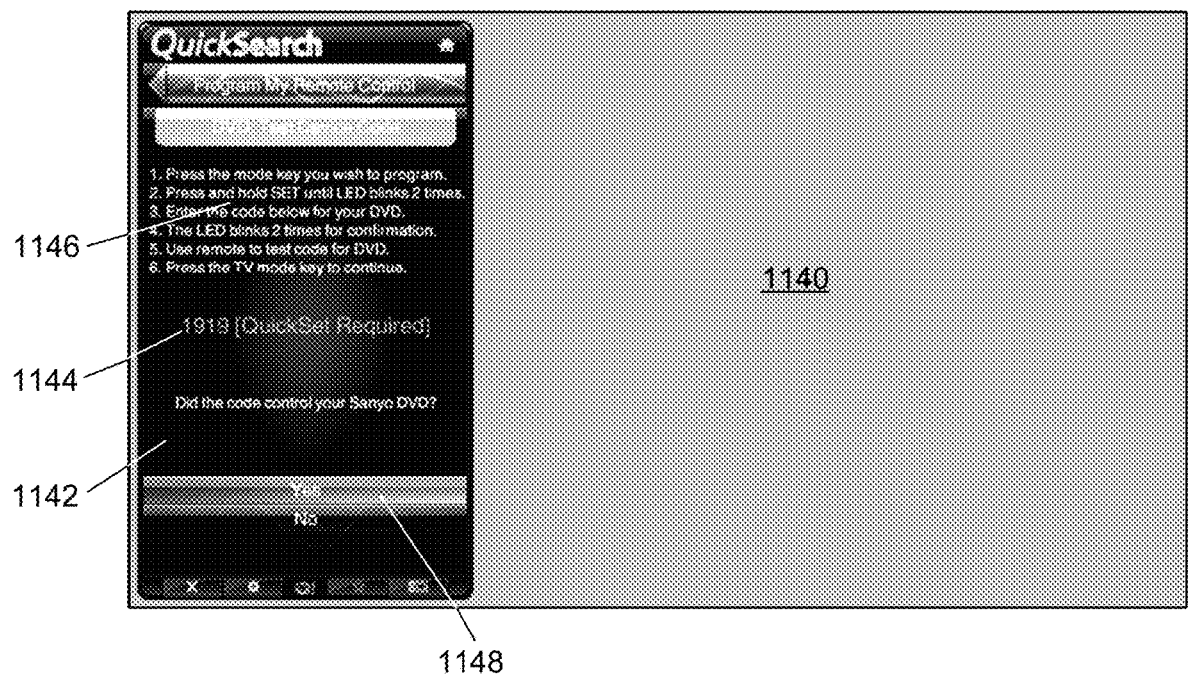
Figure 11C:
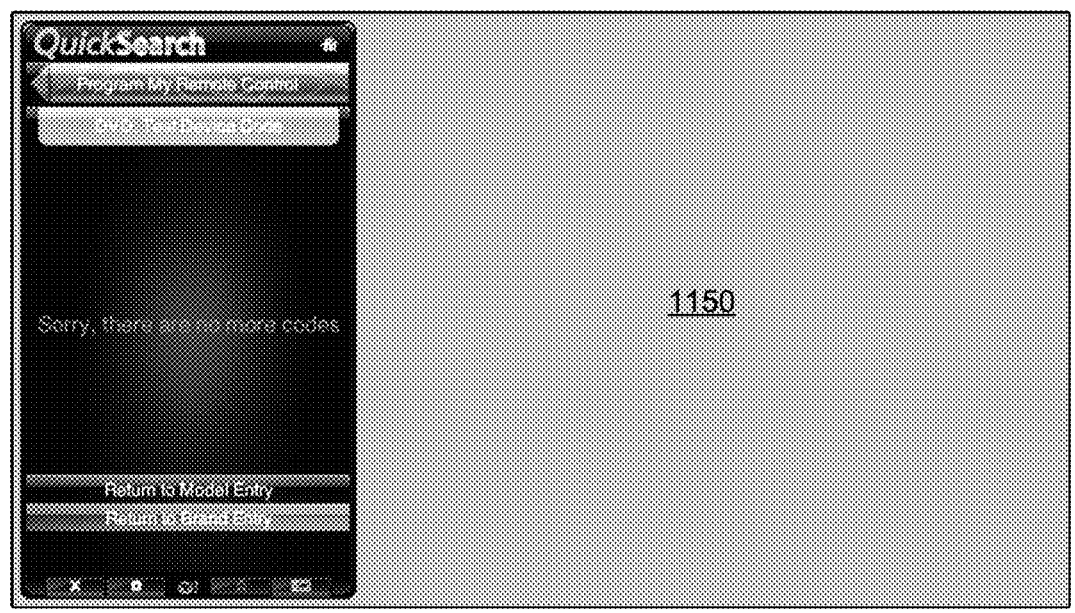
Figure 11D:
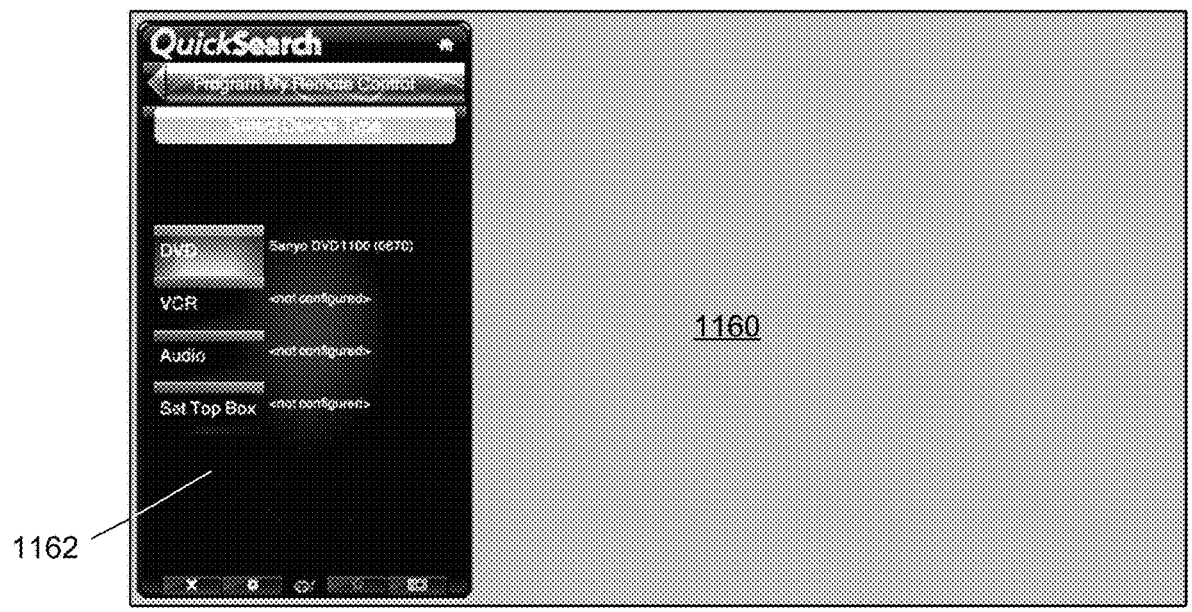

A second exemplary embodiment of the instant invention will now be presented in conjunction with FIGS. 10 and 11. Turning to FIG. 10, an exemplary system 1000 is illustrated wherein the configuration of a universal remote control 101 to command, for example, an AV receiver 1004 and/or a DVD player 1006 may be facilitated via interaction with an Internet enabled TV set 1002. In order to support Internet connectivity and functionality, TV 1002 may be provisioned with a software platform such as Yahoo Connected TV, Google TV, etc., which platforms may support download and installation of third-party applications, often referred to in the art as "Apps" or "Widgets". Such third party applications (hereafter referred to as a "widgets") may be readily developed using SDKs provided for this purpose by the platform vendor and may be designed for permanent or temporary installation into a storage device 1012 provided for that purpose as part of a suitably equipped TV set 1002. It will be appreciated that storage 1012 may take the form of any type of readable and/or writeable media, such as, for example, internal flash or RAM memory, a memory stick, a hard disk, a smart card, etc., as appropriate for a particular implementation. A manufacturer or developer of a universal controlling device 101 may accordingly develop and make available a widget to assist users in the set up of the controlling device 101. As will be appreciated, such a set up widget 1020 may be made available online for user selection and download from an Internet accessible server 1010, or alternatively such a widget may be preinstalled in TV 1002 by the manufacturer of that TV, for example in cases where controlling device 101 is provided together with TV 1002.

Once installed and activated by a user, widget 1020 may serve to guide the user through set up of controlling device 101 as will now described in conjunction with FIGS. 11A through 11D, which figures comprise a series of exemplary displays on TV 1002 during set up of an exemplary device. While the displays presented in these exemplary figures are typical of those which may be generated during execution of such a set up widget on a Yahoo Connected TV compatible appliance, it will be appreciated that alternate widget embodiments may utilize other suitable Internet TV platforms and, as such, the particular format and/or layout of the presented displays is by way of illustration only and not intended to be limiting in any manner.

Activation of the set up widget 1020 may occur via selection of an on-screen icon 1102 from a home screen 1100. Such selection may be performed, for example, via the use of navigation keys 214 of controlling device 101 to move a cursor on TV display 1100 until icon 1102 is highlighted, followed by activation of a select key 222. As will be appreciated, other methods of selection for example cursor movement by gesture or touchpad input, explicit character entry, dropdown menu selection, etc., may be available in particular implementations of TV 1002, and accordingly the term "selection" hereafter should be understood to comprise any such method or any other equivalent, as appropriate for a particular implementation.

Once activated, widget 1020 may reference a database of appliance model and setup code information 1040 to enable a model-based set up code search. All or part of database 1040 may be stored locally on TV 1002, either configured at time of manufacture or downloaded as part of or in conjunction with widget 1020; or may be located on a remote server 1014 (which may be part of or separate from server 1010) and accessed via Internet connection 1008. With reference to screen display 1110, setup widget 1020 may commence by displaying a listing 1112 of available appliance device types from which a user may select a desired device for configuration, for example selecting the "DVD" item 1114 from list 1112 in order to commence configuration of controlling device 101 to command operation of DVD player 1006. Upon selection of a device to be configured, a user may next be presented with display 1120 comprising a prompt 1124 to begin entry of a brand name for the DVD player to be configured, together with an alphanumeric keyboard 1122. As a user enters a brand name by selecting a series of characters from keyboard 1122, widget 1020 may concurrently scan database 1040 and commence an interactive display of available brand names which match the partially completed user entry. By way of example, as illustrated, after a user has entered the first three letters "s-a-n" 1126, widget 1020 may automatically display of list of matching brand names 1128, for example "Sansui" and "Sanyo". At any time, a user may select a brand name, which selection may result in display 1130 where, in a similar manner to that described above, a user may next enter model number information and select a matching or closely matching entry from an interactive list of model numbers 1132. It will also be appreciated that selection of a brand and/or model of an appliance to this same end may also or alternatively be facilitated through the use of menus, tree structures, or the like without limitation.

Once a brand and model for an appliance have been selected, as illustrated in display 1140 widget 1020 may present set up instructions 1142 suitable for configuring controlling device 101 to operate the desired appliance, for example a Sanyo DWM1000M DVD player 1006. Displayed set up instructions 1142 may include a set up code number 1144 corresponding to a command code set considered most likely to operate appliance 106. After a user has utilized this set up code number to configure controlling device 101, for example by following displayed instructions 1146, the user may be requested to test the controlling device and report the outcome to set up widget 1020 via a communication to the device upon which the set up widget is operating, for example to select from presented "yes" or "no" icons 1148. If a "no" response is input, set up widget 1020 may display the next most likely set up code number corresponding to the specified appliance brand and model and the above configure and test steps may be repeated. If all likely set up codes have been exhausted, a display 1150 may be presented to this effect, possibly together with guidance on where additional assistance may be obtained, for example a customer service telephone number, a Web site URL, etc. (not illustrated.) In some embodiments, such guidance may vary depending on current circumstances, for example, a type and/or brand of appliance or controlling device being configured, data stored from previous set up sessions, etc. If on the other hand a successful set up is reported, for example by user selection of "yes" from display 1140, a completion display 1160 may be presented comprising panel 1162 from which a user may exit the set up widget or may select another device type to be configured.

It will be appreciated that in various embodiments the exact nature of many of the steps describe above may be varied not only according to the specific Internet enabled TV platform being used, but also according to the capabilities of the controlling device involved. For example, while the illustrative steps presented above are generally suitable for configuration of conventional controlling devices which do not include any special adaptation or accommodation for use in conjunction with interactive setup widgets, support for controlling devices with a greater degree of interaction may also be provided within particular embodiments of widgets. For example, in cases where a controlling device such as device 100 of the earlier-described embodiment is to be configured, interactions such as those previously described in conjunction with the flowchart of FIGS. 7 and 9 may be incorporated, mutatis mutandis, into set up widget 1020. By way of further example, in cases where the controlling device to be configured is capable of bi-directional communication with the platform appliance upon which a set up widget is implemented, the user set up code number entry steps described in conjunction with display 1140 of FIG. 11 may be replaced by a direct download of the set up code number, or even the code data itself, into the controlling device.

Various other modifications or enhancements to the embodiments described above will be apparent to those of skill in the art. For example, certain controlling devices may be adapted to identify themselves to a set up widget, using for example a distinctive infrared or RF transmission, thus allowing the set up widget to automatically determine a suitable method of interaction, device command library, etc., for use during the set up process. The command code database searched by the set up widget may comprise a local portion and a remote portion wherein the local portion is searched first and the remote portion accessed only if no suitable code set is found in the local portion, as further described for example in U.S. Pat. No. 7,046,161, of like assignee and incorporated herein by reference in its entirety. In a yet further embodiment, a set up widget may upload copies of controlling device settings, configurations, etc., to server 1014 for storage and potential future retrieval by a user, for example upon acquisition of a new or additional controlling device or appliance. Alternatively or in conjunction with such a service, server 1014 may aggregate such uploaded data for statistical purposes, to generate user preference information, to offer product recommendations, etc., as further described for example in U.S. Pat. No. 7,093,003 of like assignee and incorporated herein by reference in its entirety.

While specific embodiments of the present invention have been described in detail, it will be appreciated by those skilled in the art that various modifications and alternatives to those details could be developed in light of the overall teachings of the disclosure. For example, it should be appreciated that any of the above described methods can be used alone or in combination to setup the remote controls 100 or 101. Additionally, as noted, the functionality of the universal remote controls 100 or 101 can be included in other devices such as PDAs, personal computers, home devices, or the like thus also making such devices a controlling device like a universal remote control. Further, while the exemplary embodiment above is presented in terms of interactions between a set top box or an Internet-connected TV and a universal remote control, it will be appreciated that many other appliance types, e.g. PVRs, DVDs, PCs, etc. may be substituted for these devices without altering the spirit of the invention. Accordingly, it will be understood that the particular arrangements and procedures disclosed are meant to be illustrative only and not limiting as to the scope of the invention which is to be given the full breadth of the appended claims and any equivalents thereof.

All of the cited patents and patent applications are hereby incorporated by reference in their entirety.

What is claimed is:

1. A controlled device, comprising:
   a receiver for receiving communications from a remotely located controlling device;
   a processing device coupled to the receiver; and
   a memory storing executable instructions, wherein the instructions, when executed by the processing device, cause the controlled device to:
   automatically progress through a setup procedure comprising a first plurality of setup procedure steps in response to the controlled device being repeatedly commanded, via respective, plural communications received via use of the receiver from the controlling device, to perform a first operation, wherein each of the plural communications is associated with a transmission by the controlling device of a respective one of a plurality of command codes, until the controlled device is commanded, via a subsequent communication received from the controlling device via use of the receiver, to perform a second operation, different than the first operation; and
   in response to the controlled device being commanded to perform the second operation, causing a command codeset having the respective one of the plurality of command codes last transmitted by the controlling device before the transmission by the controlling device of the subsequent communication to be provisioned to the controlling device for use by the controlling device to transmit commands to a target device to control operational functions of the target device.

2. The controlled device as recited in claim 1, wherein the controlled device comprises a set-top box and the target device comprises a television.

3. The controlled device as recited in claim 1, wherein the command codeset to be provisioned to the controlling device comprises an infrared command code set.

4. The controlled device as recited in claim 1, wherein the instructions cause the controlled device to commence automatic progression of the setup procedure in response to the controlled device being commanded via the controlling device to perform a third operation.

5. The controlled device as recited in claim 1, wherein communications received via use of the receiver from the controlling device comprise commands received from the controlling device transmitted via use of an RF protocol.

6. The controlled device as recited in claim 1, wherein communications received via use of the receiver from the controlling device comprises commands received from the controlling device transmitted via use of an IR protocol.

7. The controlled device as recited in claim 1, wherein the controlled device comprises a media accessing device.

8. The controlled device as recited in claim 1, wherein the controlled device comprises a transceiver coupled to the processing device for receiving the executable instructions from a remote server for storage in the memory.

9. The controlled device as recited in claim 1, wherein the setup procedure comprises a second plurality of setup procedure steps for identifying the plurality of command codes in response to communications received via use of the receiver from the controlling device.

10. The controlled device as recited in claim 9, wherein the plurality of command codes are identified as a function of at least a brand for the target device that is specified via use of the second plurality of setup procedure steps.

11. The controlled device as recited in claim 1, wherein controlled device further comprises a transmitter and the instructions cause the controlled device to transmit to a display device via use of the transmitter communications to cause the display device to display instructional information to a user while automatically progressing through the setup procedure.

12. The controlled device as recited in claim 11, wherein the instructional information being displayed by the display device comprises a series of displayed navigable menus.

13. A system, comprising:
    a controlling device; and
    a controlled device;
    wherein the controlled device comprises:
    a receiver for receiving communications from the controlling device;
    a processing device coupled to the receiver and the transmitter; and
    a memory storing executable instructions, wherein the instructions, when executed by the processing device, cause the controlled device to:
    automatically progress through a setup procedure comprising a first plurality of setup procedure steps in response to the controlled device being repeatedly commanded, via respective, plural communications received via use of the receiver from the controlling device, to perform a first operation, wherein each of the plural communications is associated with a transmission by the controlling device of a respective one of a plurality of command codes, until the controlled device is commanded, via a subsequent communication received from the controlling device via use of the receiver, to perform a second operation, different than the first operation; and
    in response to the controlled device being commanded to perform the second operation, causing a command codeset having the respective one of the plurality of command codes last transmitted by the controlling device before the transmission by the controlling device of the subsequent communication to be provisioned to the controlling device for use by the controlling device to transmit commands to a target device to control operational functions of the target device.

14. The system as recited in claim 13, wherein the controlled device comprises a set-top box and the target device comprises a television.

15. The system as recited in claim 13, wherein the command codeset provisioned to the controlling device comprises an infrared command code set.

16. The system as recited in claim 13, wherein the instructions cause the controlled device to commence automatic progression of the setup procedure in response to the controlled device being commanded via the controlling device to perform a third operation.

17. The system as recited in claim 13, wherein communications received via use of the receiver from the controlling device comprise commands received from the controlling device transmitted via use of an RF protocol.

18. The system as recited in claim 13, wherein communications received via use of the receiver from the controlling device comprises commands received from the controlling device transmitted via use of an IR protocol.

19. The system as recited in claim 13, wherein the controlled device comprises a media accessing device.

20. The system as recited in claim 13, wherein the controlled device comprises a transceiver coupled to the processing device for receiving the executable instructions from a remote server for storage in the memory.

21. The system as recited in claim 13, wherein the setup procedure comprises a second plurality of setup procedure steps for identifying the plurality of command codes in response to further communications received via use of the receiver from the controlling device.

22. The system as recited in claim 21, wherein the plurality of command codes are identified as a function of at least a brand for the target device that is specified via use of the second plurality of setup procedures.

23. The system as recited in claim 13, wherein controlled device further comprises a transmitter and the instructions cause the controlled device to transmit to a display device via use of the transmitter communications to cause the display device to display instructional information to a user while automatically progressing through the setup procedure.

24. The system as recited in claim 23, wherein the instructional information being displayed by the display device comprises a series of displayed navigable menus.

* * * * *